(12) United States Patent
Burton et al.

(10) Patent No.: US 10,239,246 B2
(45) Date of Patent: Mar. 26, 2019

(54) INJECTION MOLDING MACHINE

(71) Applicant: Burton Technologies, LLC, Ludington, MI (US)

(72) Inventors: John E. Burton, Ludington, MI (US); Christopher J. Burton, Ludington, MI (US)

(73) Assignee: Limworks, LLC, Ludington, MI (US)

(*) Notice: Subject to any disclaimer, the term of this patent is extended or adjusted under 35 U.S.C. 154(b) by 298 days.

(21) Appl. No.: 15/058,554

(22) Filed: Mar. 2, 2016

(65) Prior Publication Data
US 2016/0257045 A1 Sep. 8, 2016

Related U.S. Application Data

(60) Provisional application No. 62/127,703, filed on Mar. 3, 2015.

(51) Int. Cl.
*B29C 45/67* (2006.01)
*B29C 45/00* (2006.01)
(Continued)

(52) U.S. Cl.
CPC .......... *B29C 45/67* (2013.01); *B29C 45/0001* (2013.01); *B29C 45/03* (2013.01);
(Continued)

(58) Field of Classification Search
CPC .................................................. B29C 45/461
See application file for complete search history.

(56) References Cited

U.S. PATENT DOCUMENTS

| 3,981,655 A | 9/1976 | Horbach |
| 4,680,002 A | 7/1987 | Hehl |
| (Continued) | | |

FOREIGN PATENT DOCUMENTS

| EP | 0338391 | 10/1989 |
| GB | 1363643 | 8/1974 |
| (Continued) | | |

OTHER PUBLICATIONS

Invitation to Pay Additional Fees including Communication Relating to the Results of the Partial International Search Report for International Application No. PCT/US2016/020435, dated Jul. 18, 2016.

*Primary Examiner* — Joseph S Del Sole
(74) *Attorney, Agent, or Firm* — Warner Norcross + Judd LLP

(57) ABSTRACT

An injection molding machine with an injection system and a clamping system. The injection system may include a removable injection module defining a portion of the material flow path. The injection module may include all of parts that come in contact with the material between the material source and the mold. The injection module may include a valve arrangement movable between a fill position to load the injection module with material and an inject position to eject material from the injection module into the mold. The actuators for the injection module may be supported on the machine rather than the injection module. The clamping system may include a platen linear actuator to open and close the mold, and a hydraulic clamping system to apply clamping force to the closed mold. The hydraulic clamping system may include a free-float valve manifold assembly that selectively places the hydraulic cylinders in free-float mode.

4 Claims, 24 Drawing Sheets

SECTION A-A
SCALE 1 : 3

(51) Int. Cl.
  *B29C 45/03* (2006.01)
  *B29C 45/17* (2006.01)
  *B29C 45/27* (2006.01)
  *B29C 45/53* (2006.01)
  *B29C 45/68* (2006.01)
  *B29K 101/10* (2006.01)
  *B29K 83/00* (2006.01)
  *B29C 45/28* (2006.01)

(52) U.S. Cl.
  CPC ........ *B29C 45/1701* (2013.01); *B29C 45/278* (2013.01); *B29C 45/2756* (2013.01); *B29C 45/53* (2013.01); *B29C 45/68* (2013.01); *B29C 45/176* (2013.01); *B29C 45/1775* (2013.01); *B29C 45/281* (2013.01); *B29C 45/2806* (2013.01); *B29C 45/531* (2013.01); *B29C 2045/688* (2013.01); *B29C 2791/006* (2013.01); *B29K 2083/005* (2013.01); *B29K 2101/10* (2013.01)

(56) References Cited

U.S. PATENT DOCUMENTS

| | | |
|---|---|---|
| 6,334,765 B1 | 1/2002 | Ellinger |
| 6,379,119 B1 | 4/2002 | Truninger |
| 6,537,057 B2 | 3/2003 | Tamaki et al. |
| 6,878,317 B2 | 4/2005 | Kubota |
| 7,031,800 B2 | 4/2006 | Bulgrin |
| 7,128,563 B2 | 10/2006 | Teng et al. |
| 7,160,102 B2 * | 1/2007 | Zimmet ................ B29C 45/532 425/558 |
| 7,670,536 B2 * | 3/2010 | Schad ................ B29C 45/6728 264/328.1 |
| 8,647,100 B2 | 2/2014 | Grunitz |
| 8,663,536 B2 | 3/2014 | Halter et al. |
| 2003/0091684 A1 * | 5/2003 | Hefner ................ B29C 45/2756 425/549 |
| 2005/0129805 A1 * | 6/2005 | Jeanjean ............. B29C 45/6771 425/595 |
| 2013/0049239 A1 * | 2/2013 | Yoo ........................ B29C 45/34 264/1.36 |

FOREIGN PATENT DOCUMENTS

| | | |
|---|---|---|
| JP | H04208427 | 7/1992 |
| JP | 2000313028 | 11/2000 |
| JP | 2007223124 | 9/2006 |

* cited by examiner

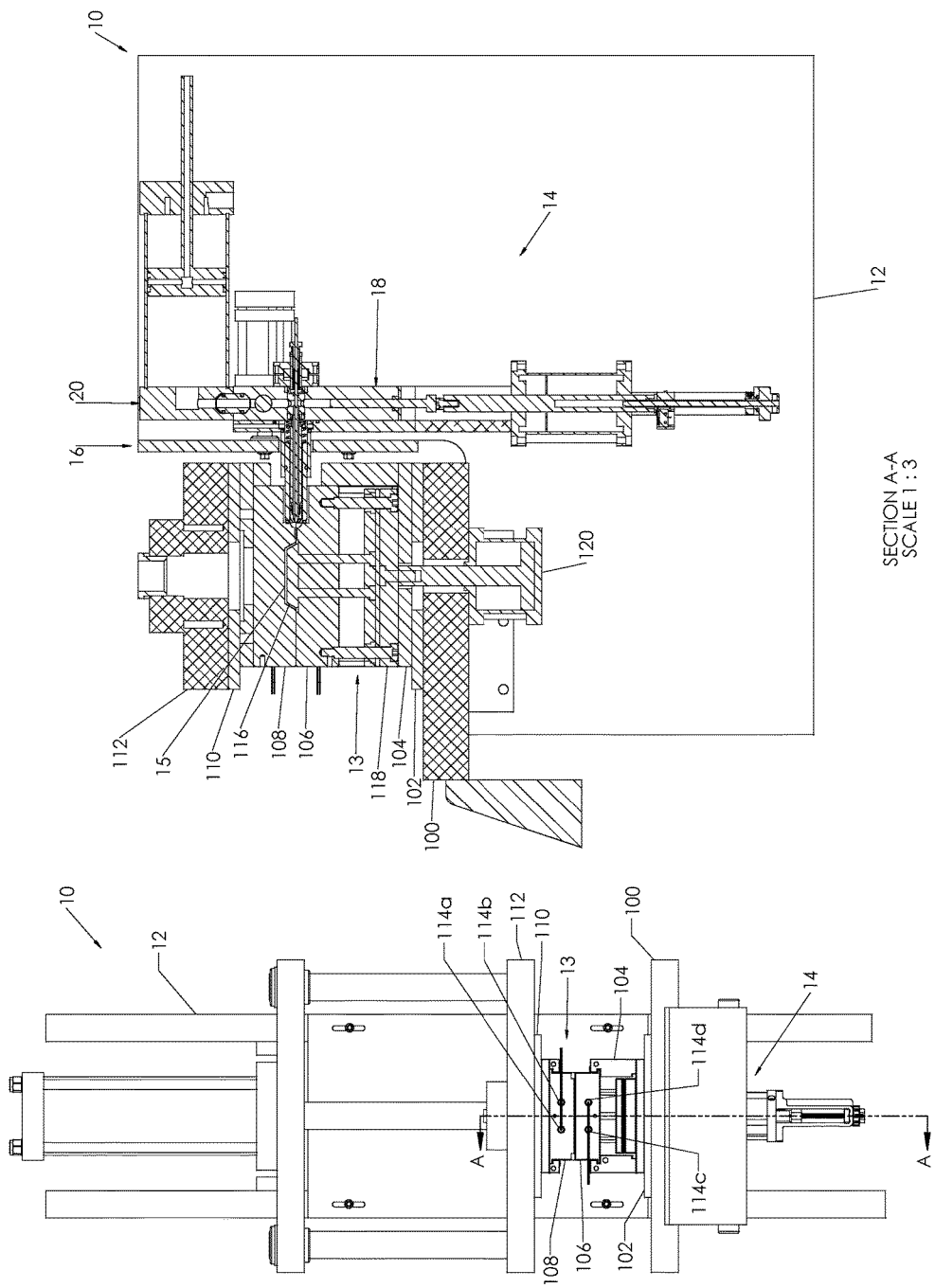

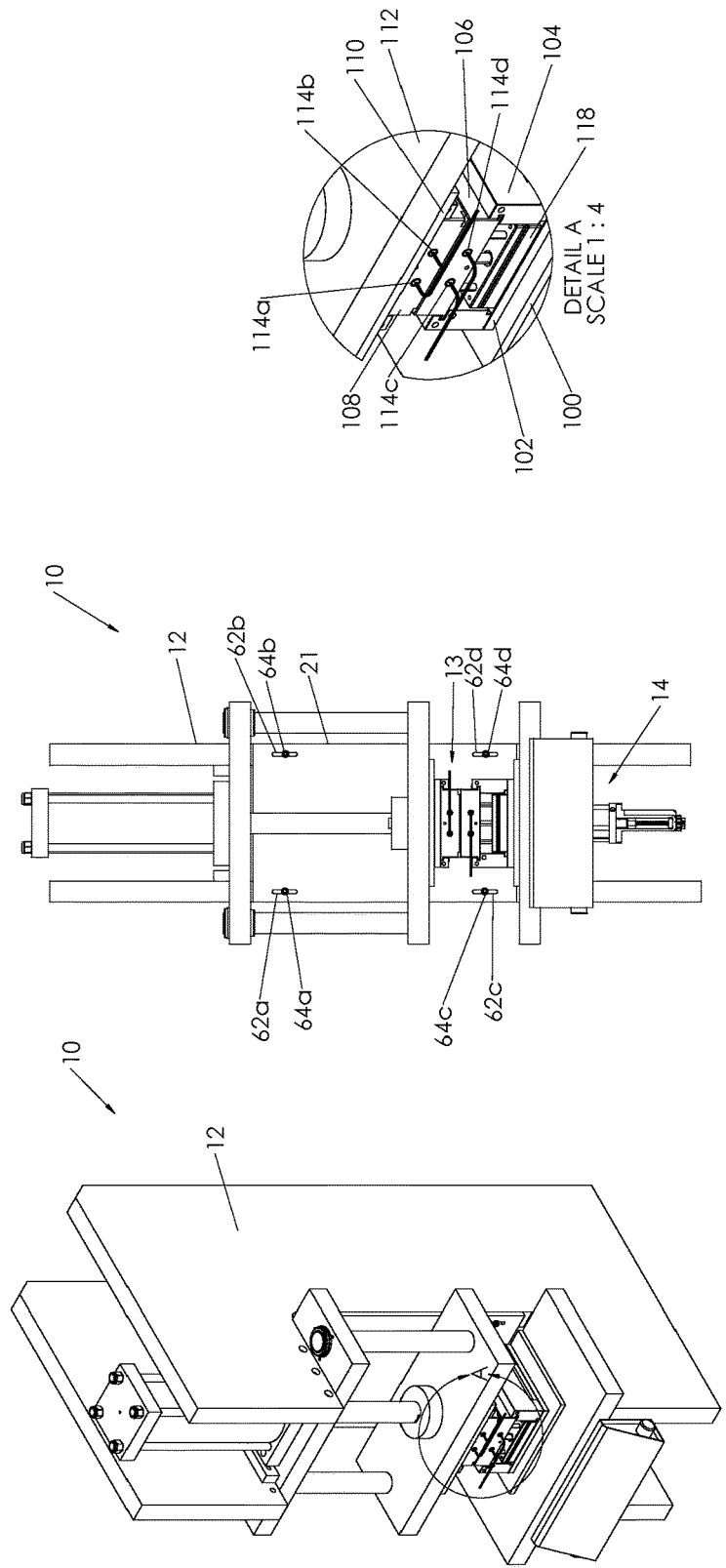

DETAIL H
SCALE 1:2

SECTION G-G
SCALE 1:2

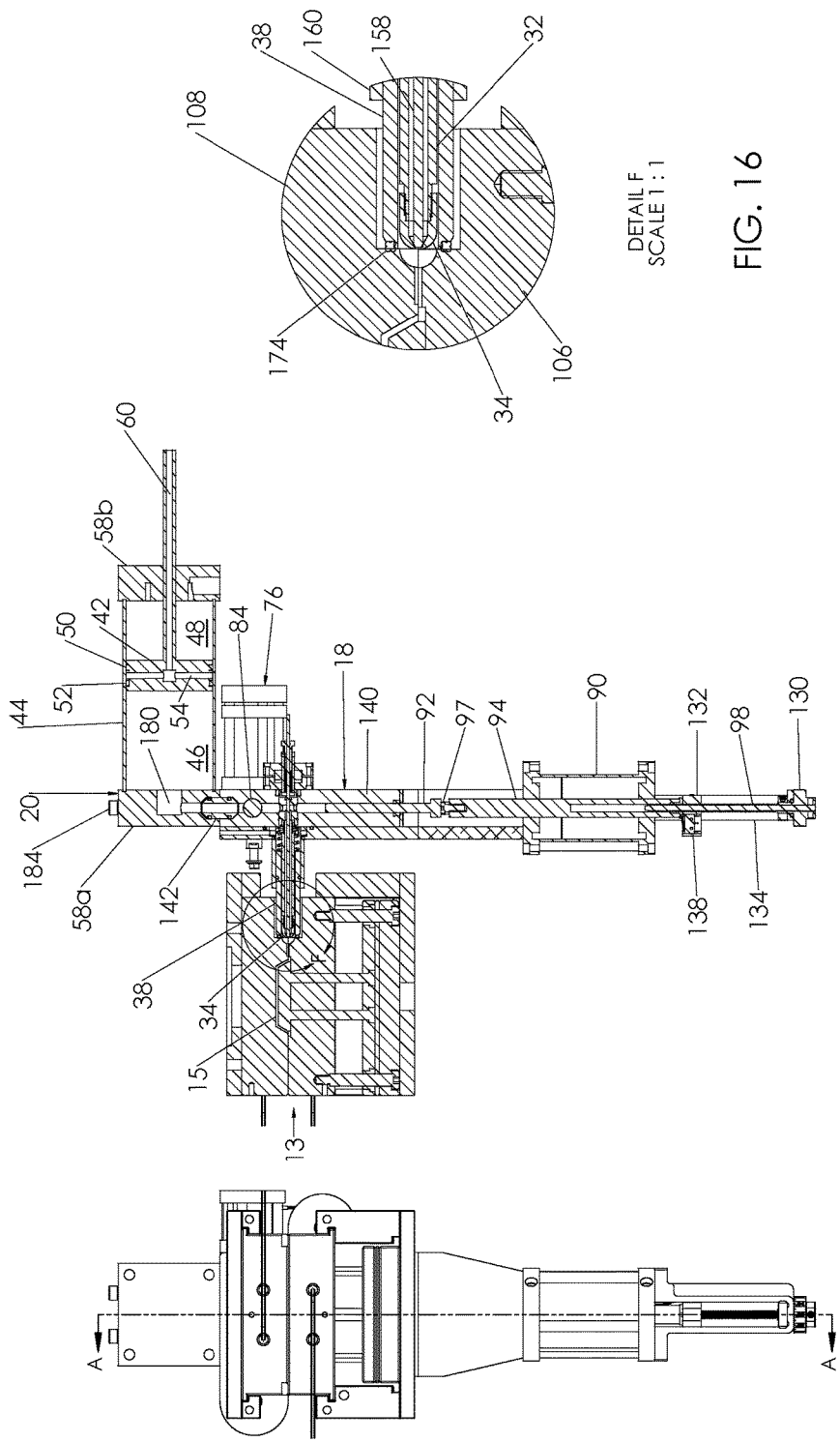

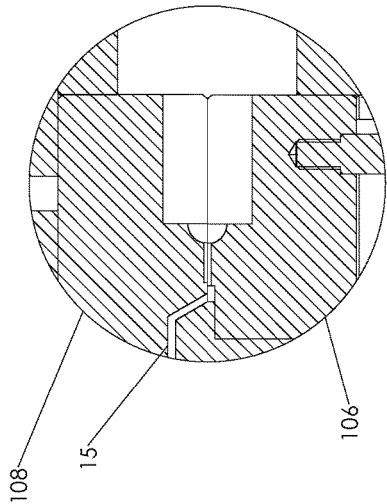
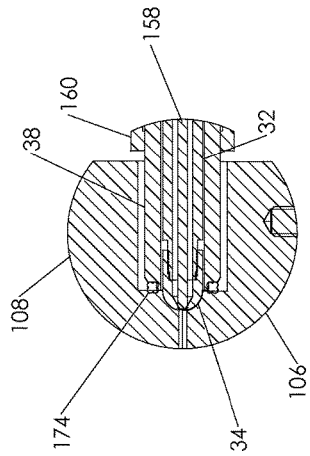
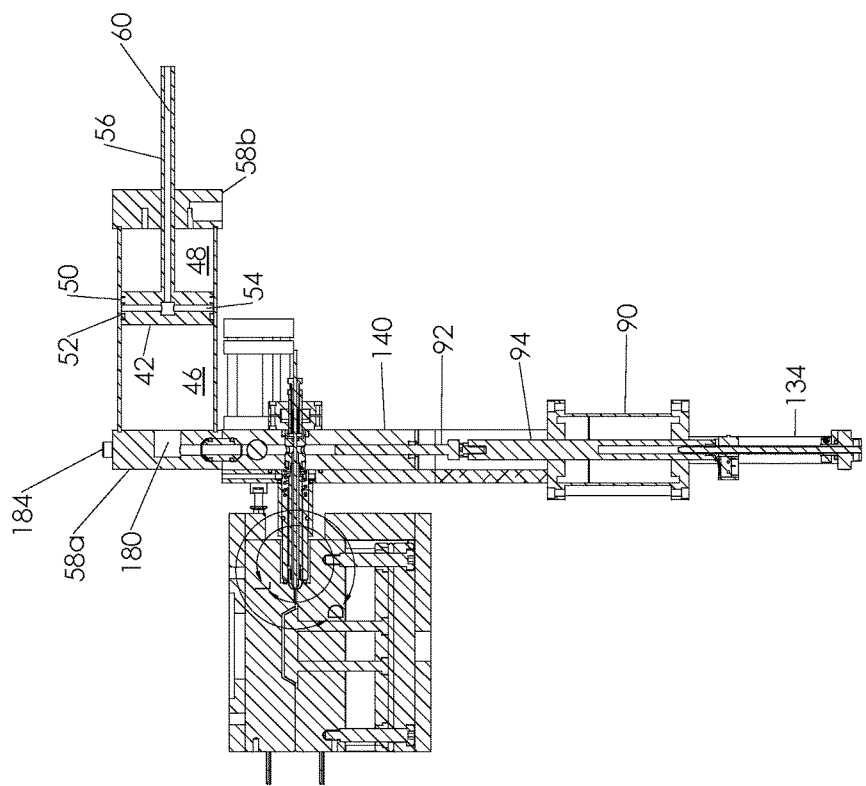

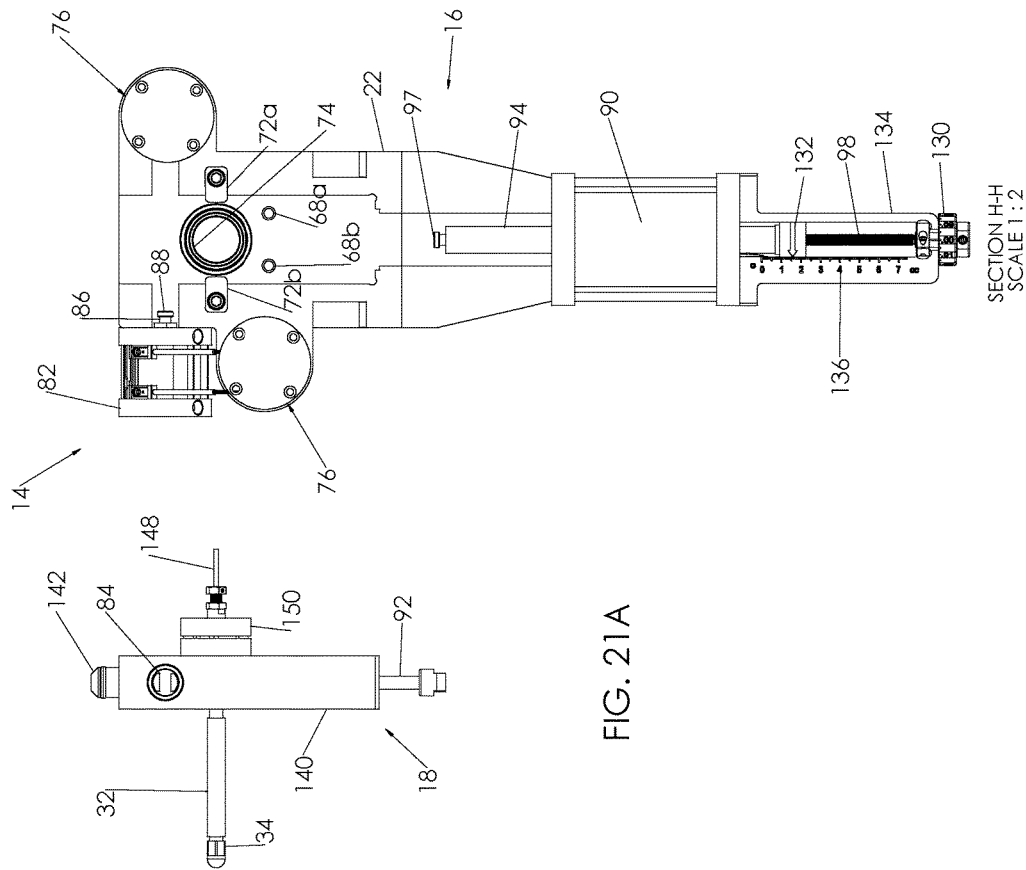
FIG. 21B
FIG. 21A
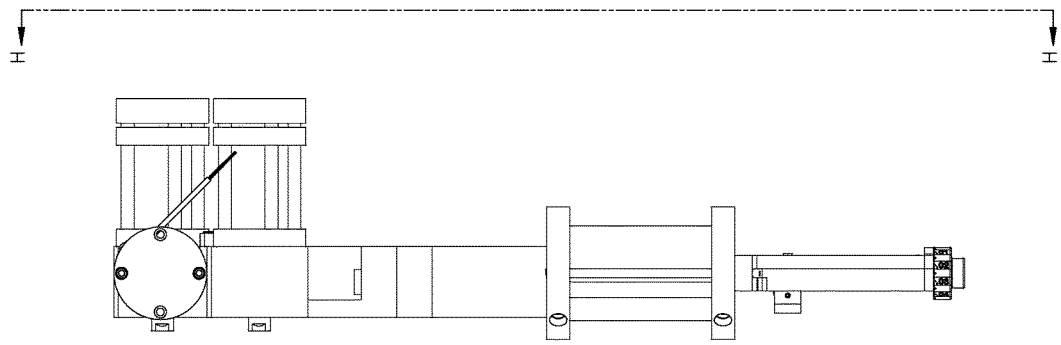
FIG. 20

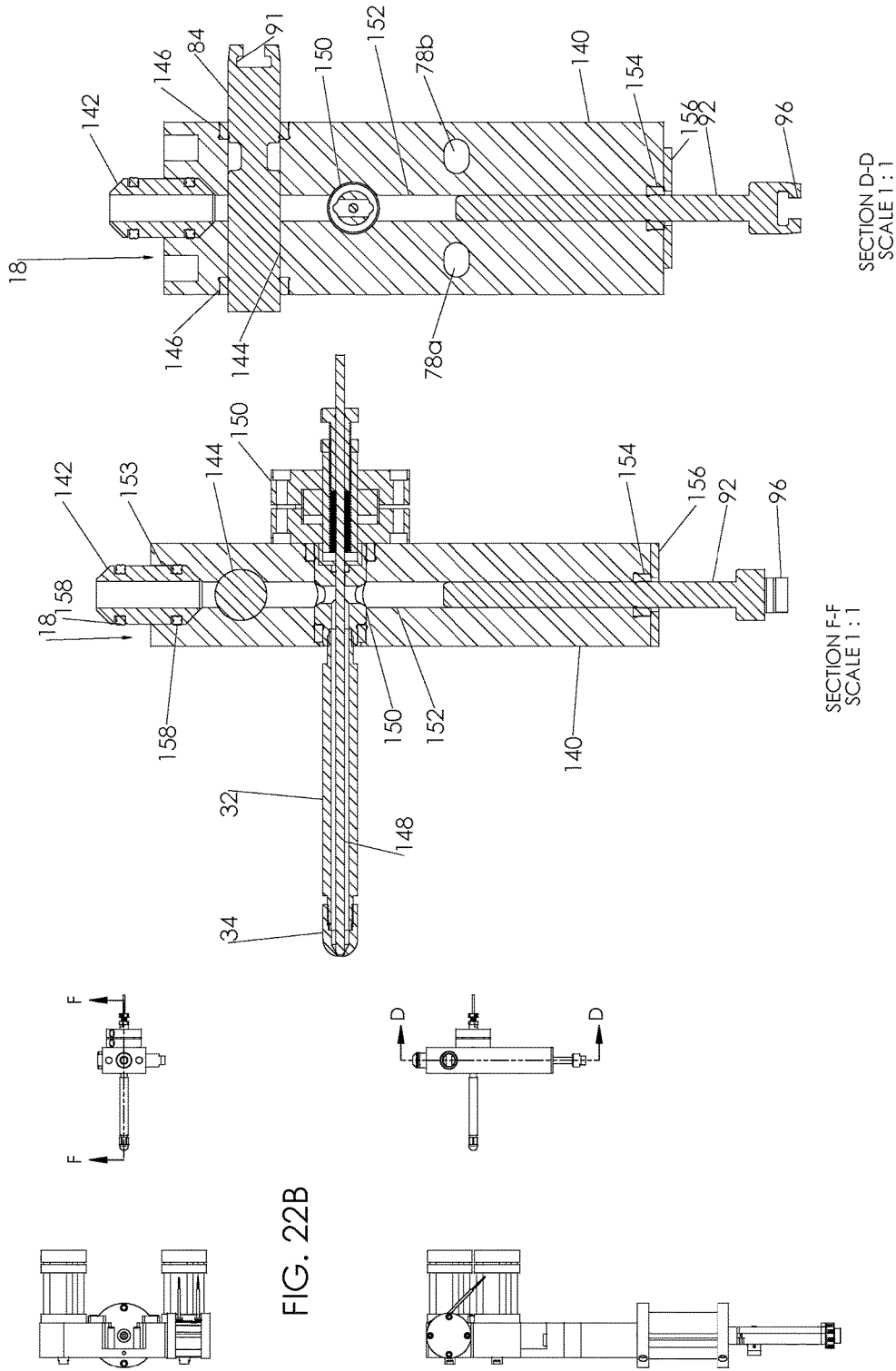

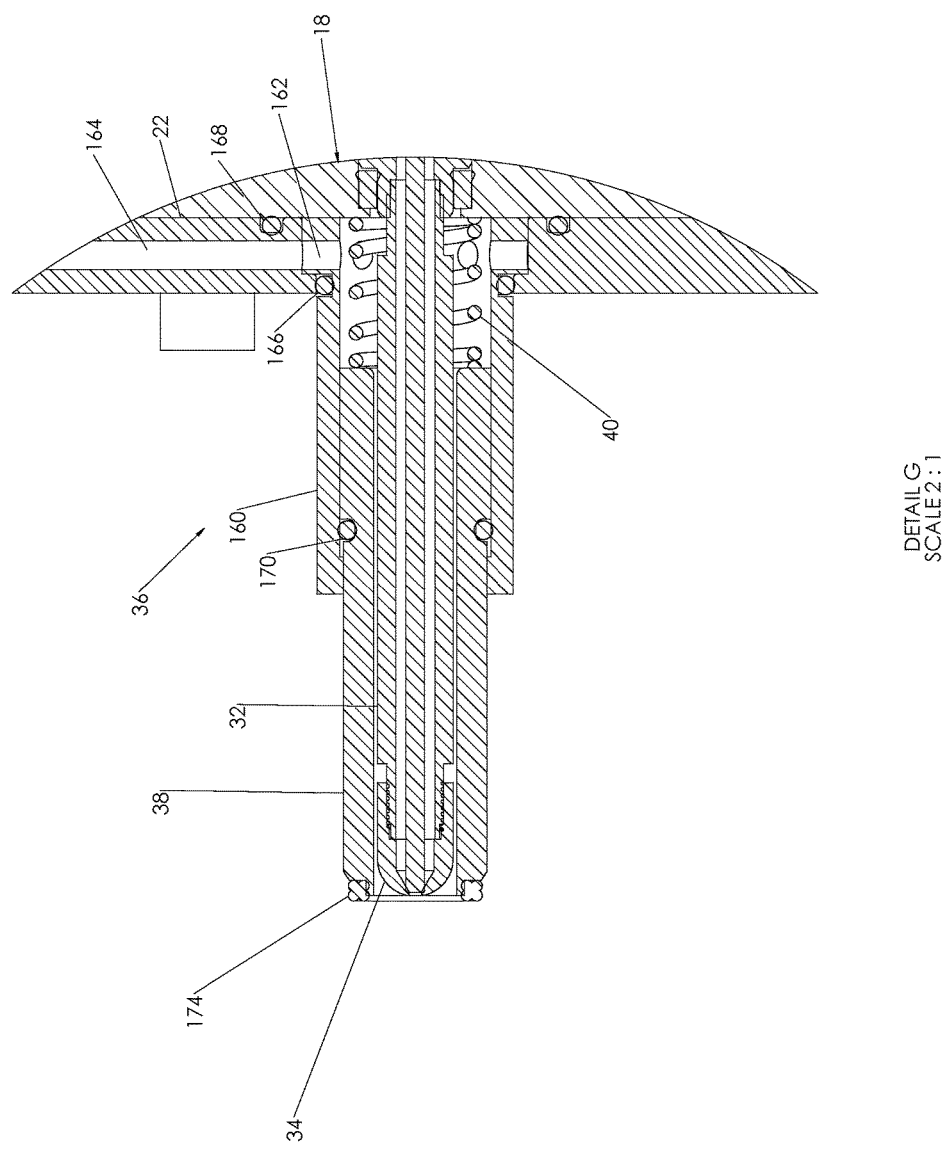

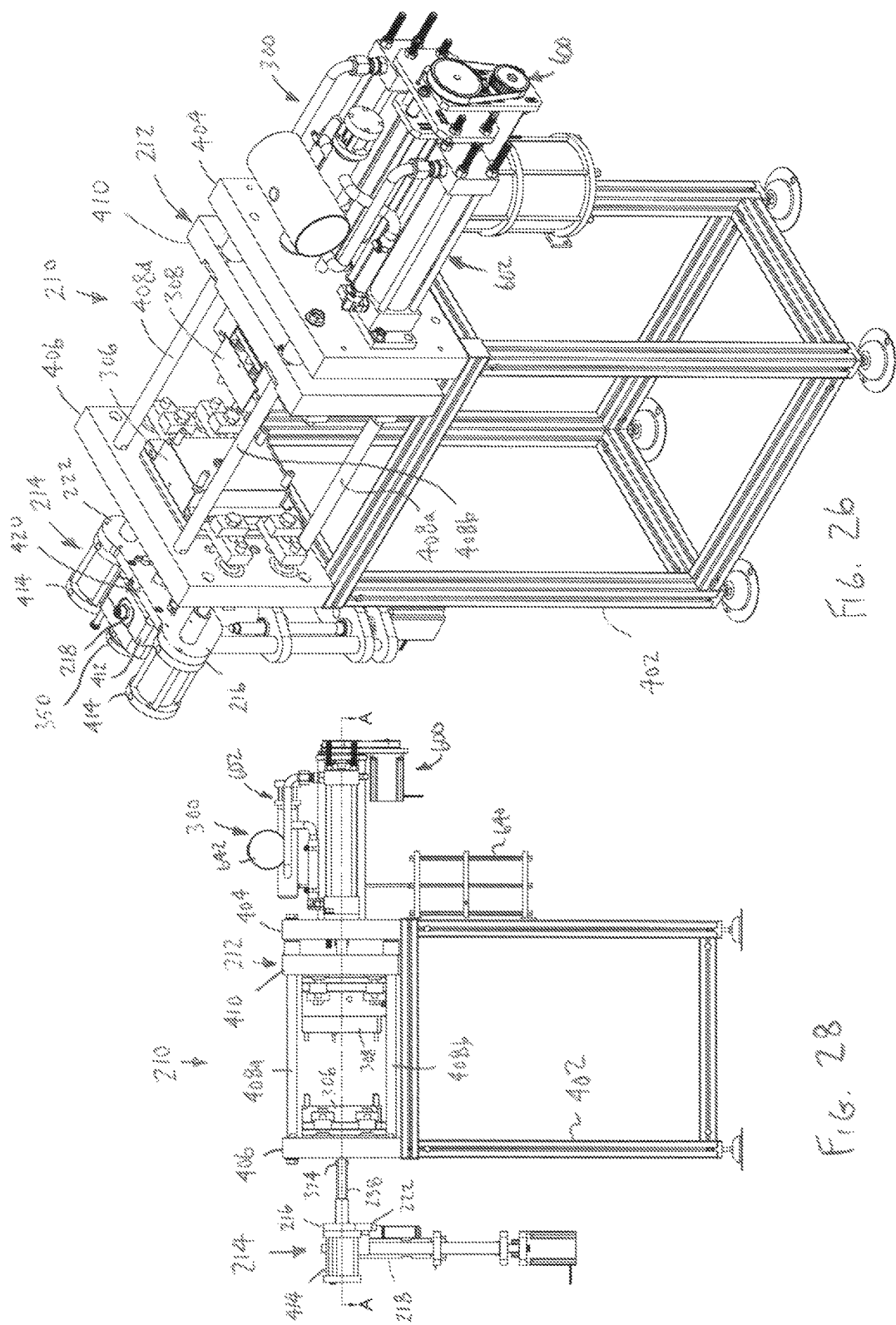

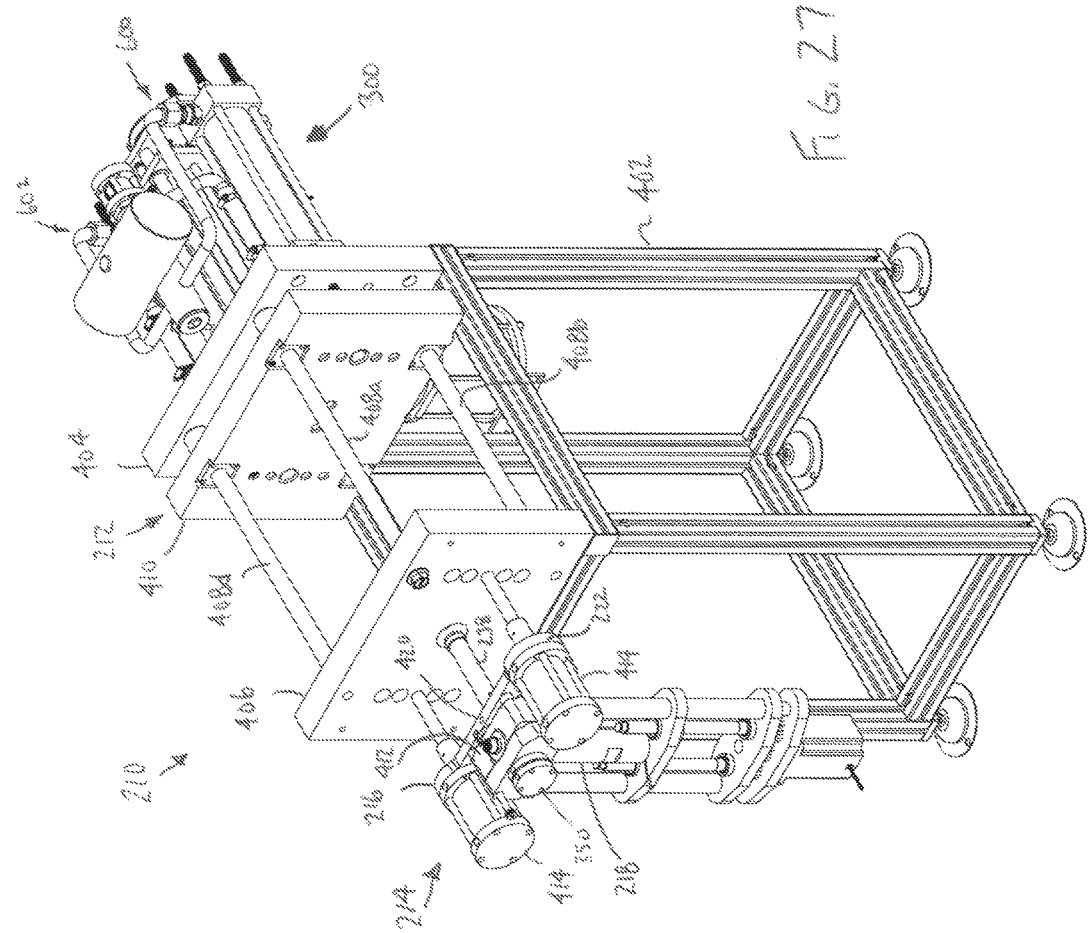

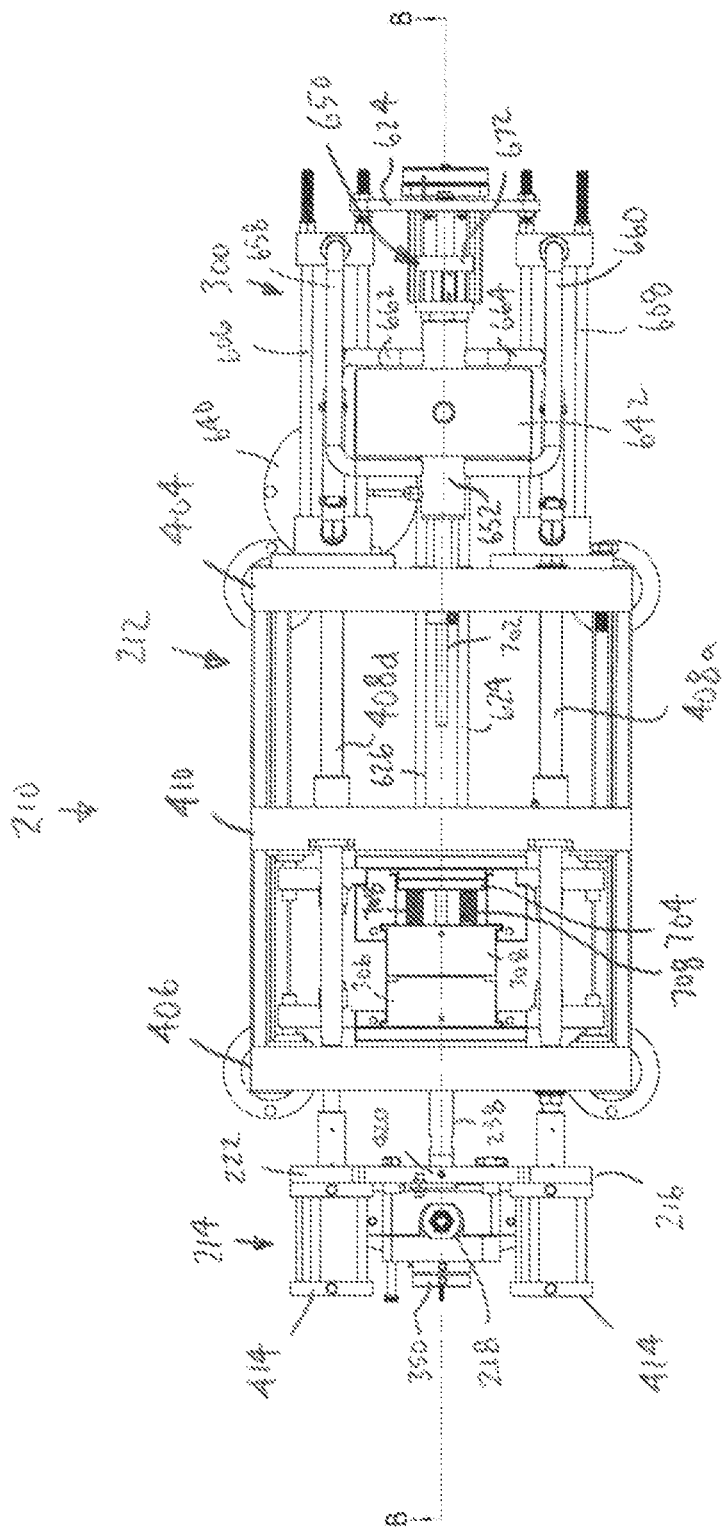

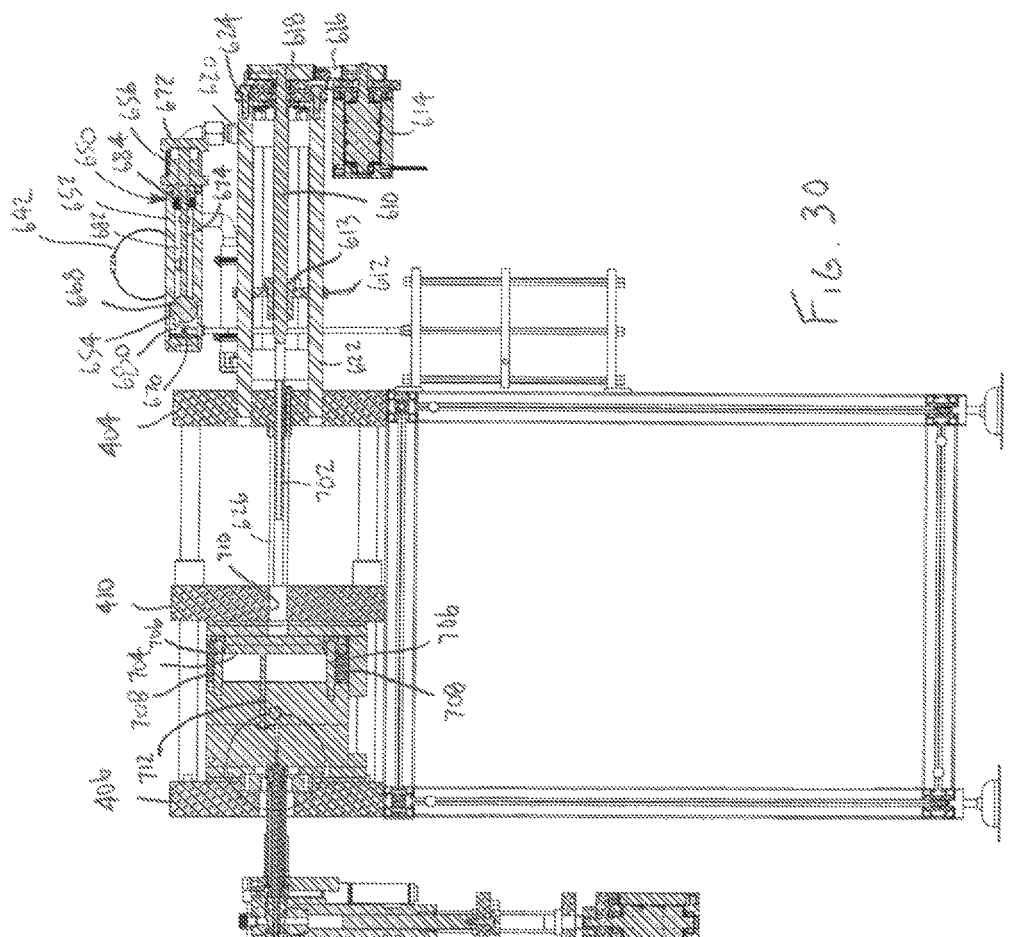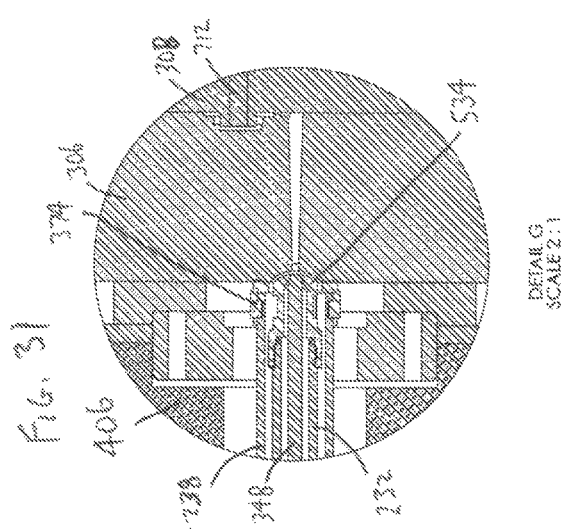

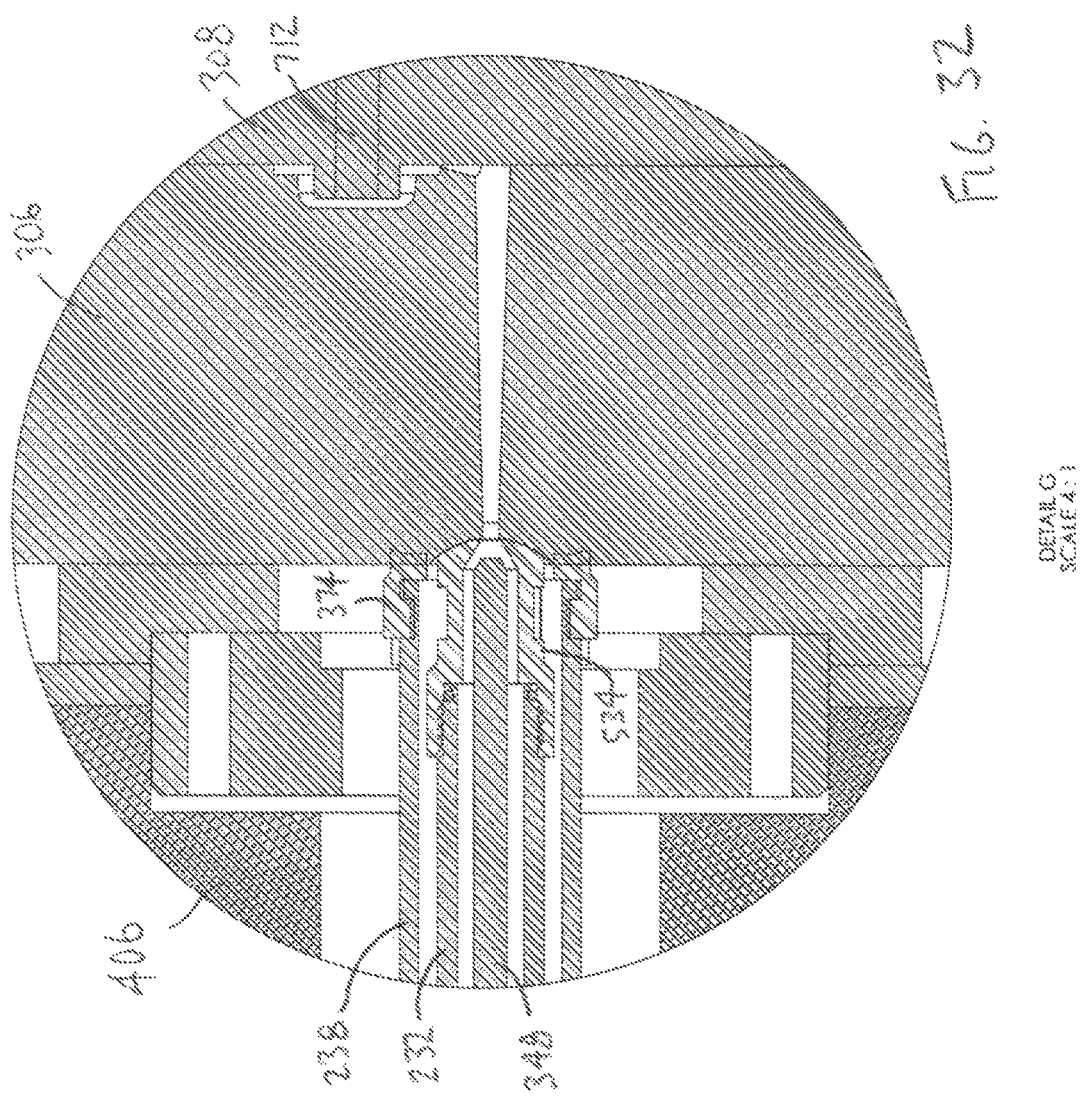

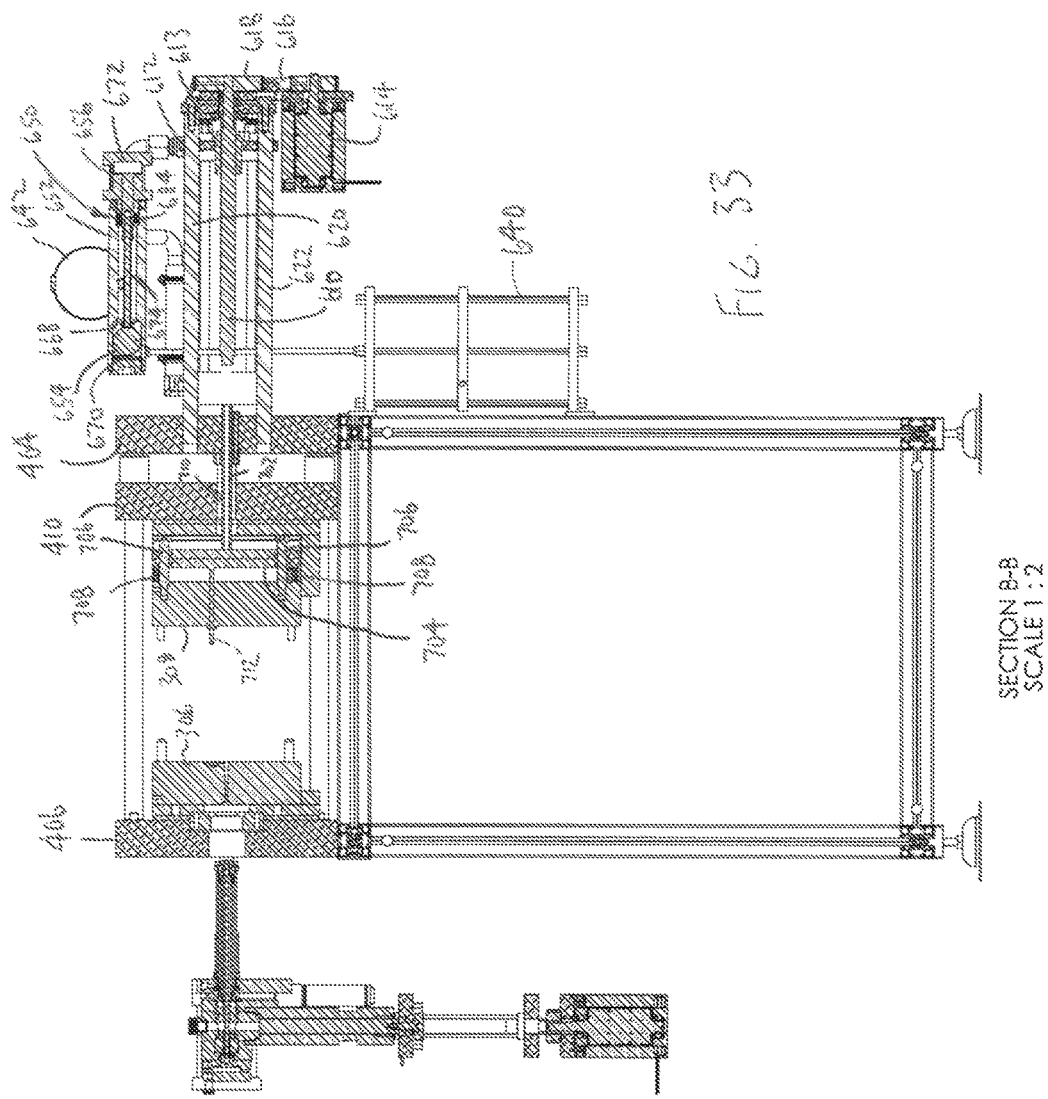

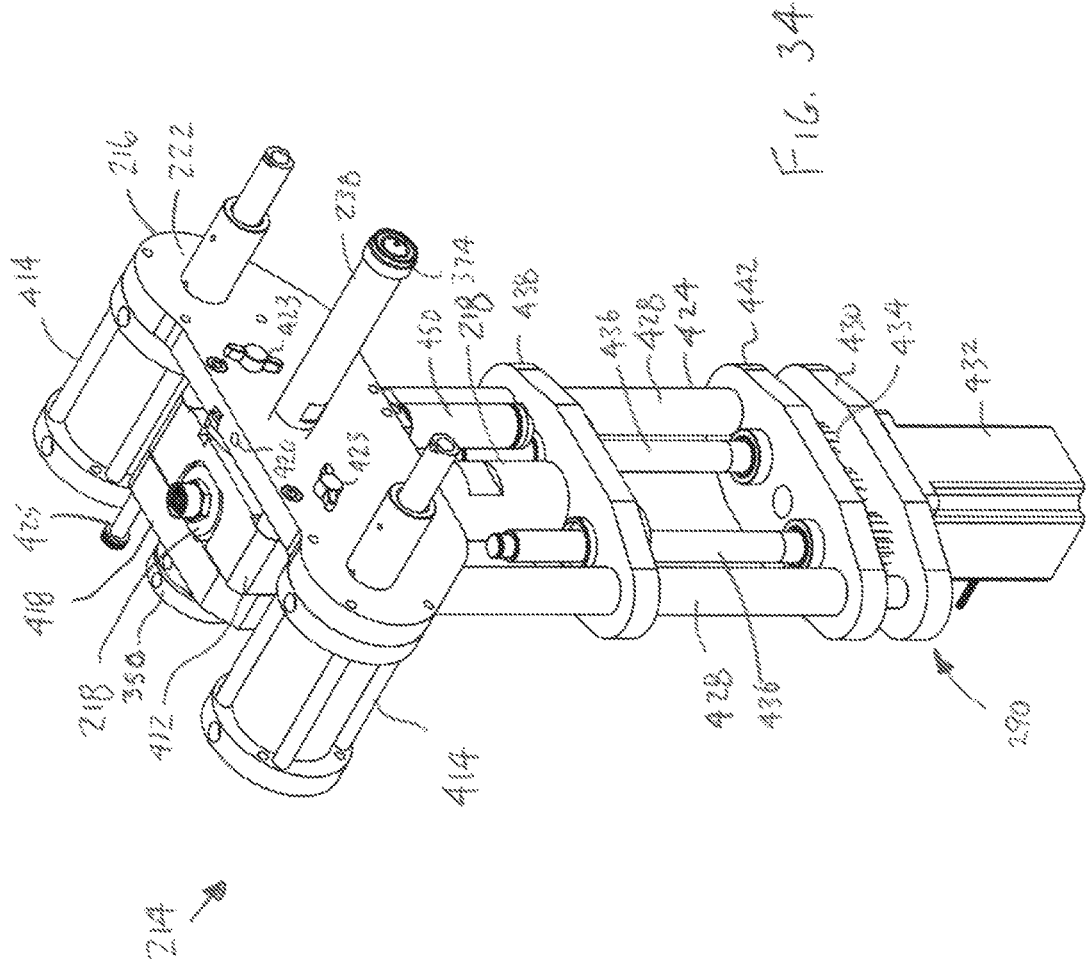

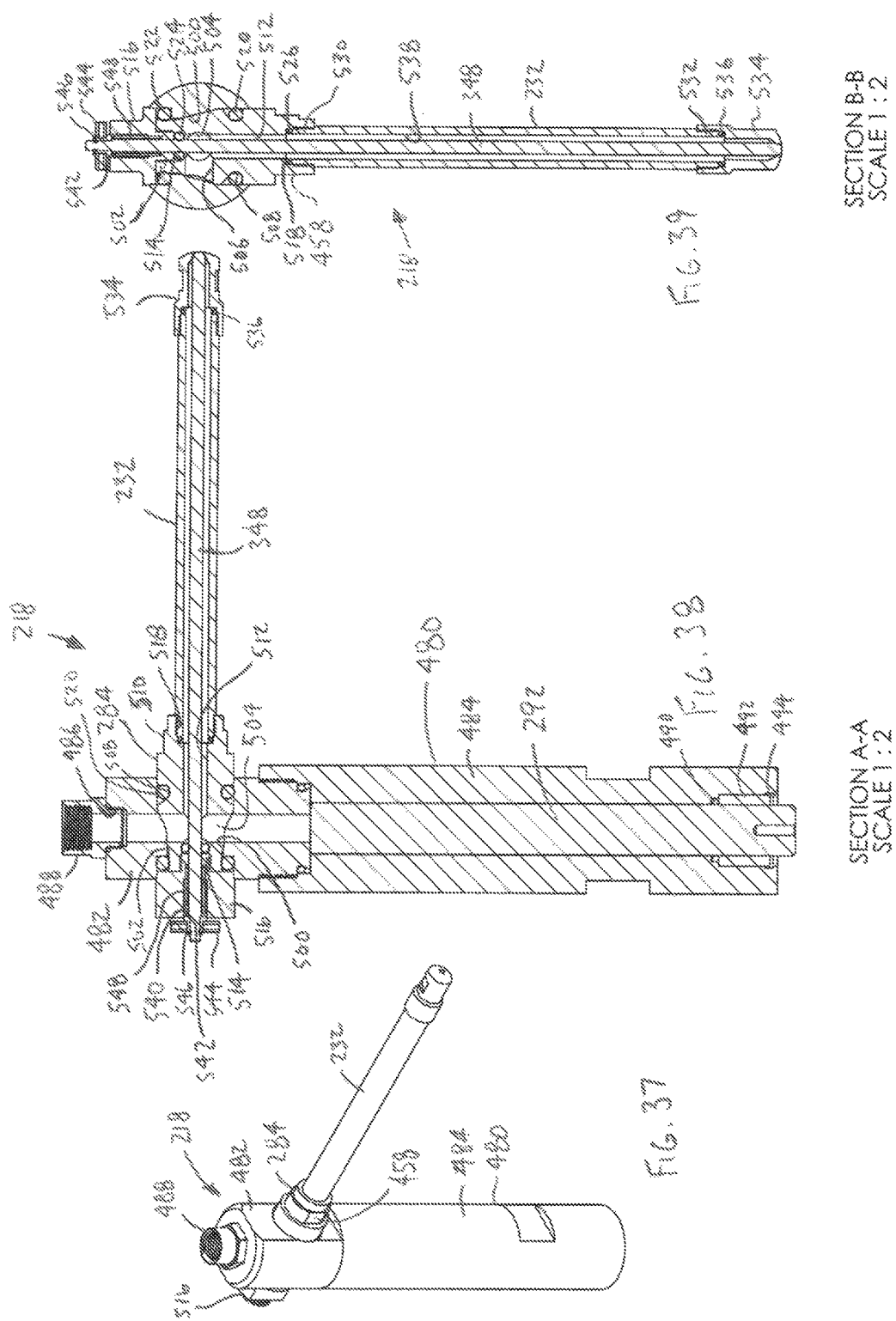

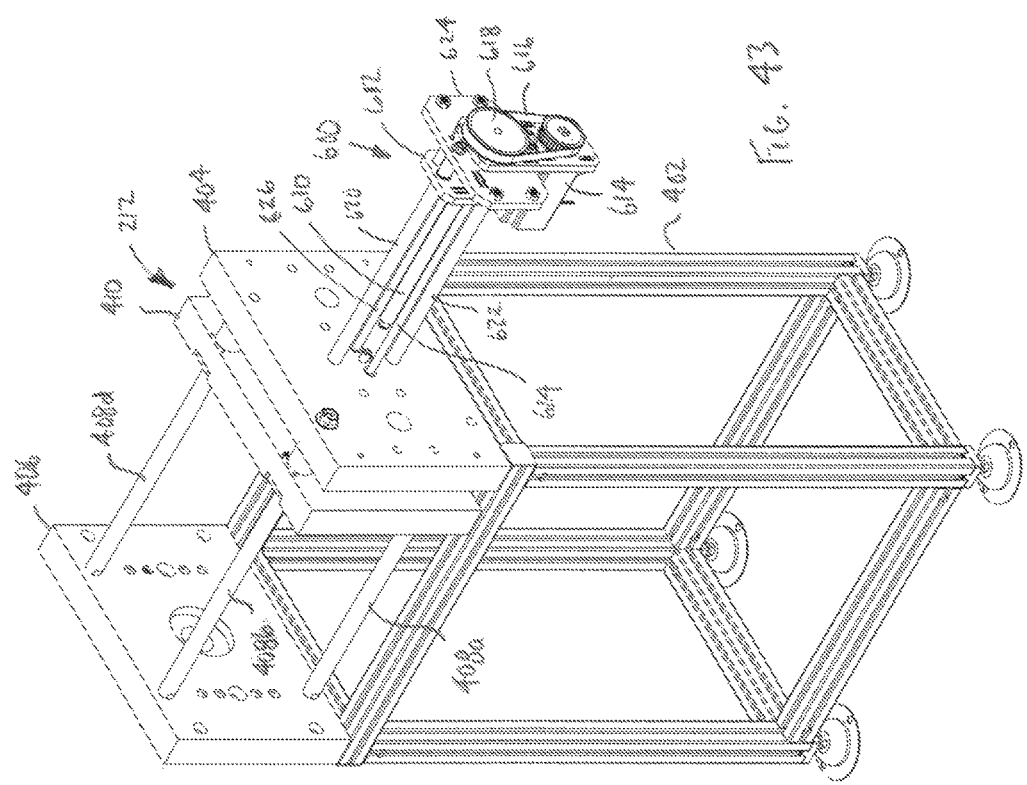

SECTION A-A
SCALE 1:2

INJECTION MOLDING MACHINE

FIELD OF THE INVENTION

The present invention relates to an apparatus for molding, and more particularly to an injection molding machine with a material injection system and a mold clamping system.

BACKGROUND OF THE INVENTION

The invention relates to injection molding machines, such as the type that produce heat cured or thermo-setting materials such as but not limited to silicone rubber. Thermoset injection units are typically built upon a screw based injection system originally designed for thermoplastic polymers. A typical thermoplastic injection system first takes material in a pellet form from a hopper and feeds it into a heated barrel where a screw rotates to convey, compress, and mix the material before plunging to force the material into the mold cavity where the material cools to become solid in order to make a part. Upon the introduction of thermoset materials, the thermoplastic injection system was adapted to inject thermoset material using many of the same elements. A typical thermoset injection first takes material in a liquid form under pressure and feeds it into a barrel where a screw rotates to convey the material before plunging to force the material into the mold cavity where the material is heated to cure and become solid in order to make a part.

Some innovations in thermoset injection systems have been focused on keeping the material at a low enough temperature before it is injected so it will not cure before entering the mold cavity. One innovation is to build a mold in more than two plates with insulation material between the plate where the thermoset material first enters the mold and the heated mold cavity plate. One disadvantage of this approach is that is can increase the cost and complexity of the mold design. A further innovation is to pump liquid through cavities in the plates to be cooled allowing a large amount of heat to be removed. One disadvantage of liquid cooling is that if the pumping system fails, the thermoset material can cure before entering the mold cavity causing the entire machine to stop working.

Other innovations are focused on metering the amount of thermoset material which enters the mold. One such innovation is a check valve with a spring to keep it shut. Placed at the nose of the screw, a typical check valve had no spring and would open from material pressure difference upon the screw being drawn back, then close from material pressure difference when the screw would plunge forward. By adding a spring, the check valve would only open from material pressure difference upon the screw being drawn back, then close from once the spring force overcame the material pressure difference before the screw would plunge forward. This allows for more accurate metering of the material exiting the barrel, as the check valve will open and close more consistently. One disadvantage of using a check valve as a shutoff is that it can still be challenging to accurately meter because the shutoff is located at the tip of the screw, and the material may have to go through several passages before entering the mold cavity. A further innovation is to put independently controlled needle shutoffs placed directly in the mold base. This allows for more accurate metering because having the shutoff located physically closer to the mold cavity reduces the volume of material being metered. One disadvantage of this innovation is that can increase the cost and complexity of the mold base.

Other innovations are focused on reducing the amount of voids in the final product due to trapped air or additional processes to remove extra material called flash. A typical mold has small passages to allow air inside the mold cavity to escape as material enters the mold cavity. Molds designed this way may produce parts with trapped air if material enters the mold cavity faster than the air can escape. It is undesirable to have voids in the part as it may adversely affect the physical properties or the aesthetics. Molds designed this way may also produce parts with additional material, called flash, if the material flows into the passages meant to allow the air to escape. It is undesirable to have flash on the part as it may require additional processing to remove. One innovation is to use a vacuum pump to remove air from the mold cavity before the material enters. The mold is then designed without air passages and a vacuum hole outside of the mold cavity area on one side of the mold and a gasket surrounding the mold cavity and the vacuum hole on one side of the mold. The mold clamping mechanism then controls the mold parting distance to the point where the gasket seals between the two halves, but the mold is not completely closed so not to plug the vacuum hole. The mold parting distance is then kept at this position until the vacuum pump has drawn out the air, then the mold is closed fully which plugs the vacuum hole and closes the parting distance. The material is then injected into the mold cavity. The advantages of this mold design are that because there is no air in the mold, the part will not have trapped air, and because there are no air passages, the part will have no flash. Some disadvantages of this mold design are that it requires an additional gasket in the mold and precise control over the mold parting distance from the clamping mechanism.

In summary, many of the innovations have focused on correcting the shortcomings of a thermoset injection system which was adapted from a thermoplastic injection system. Having an injection system designed from the ground up to respect the unique processing requirements of thermoset materials would result in a significant reduction in time, cost, and space and a significant increase in speed, accuracy, and reliability.

Quick change tooling has received much commercial success in many manufacturing processes including injection molding. The 'Master Unit Die' or 'MUD' has become the industry standard, one such version is shown in U.S. Pat. No. 5,562,935. A popular U-frame style Master Unit Die with companion mold tool inserts are shown in the drawings as an example of one type of mold that can be used with the injection molding machine. The success of the MUD system is due to the benefits of both faster tooling change over and lower tooling cost since a common mold base is reused. There are several patents and technology in the area of quick change tooling, however, this does not address the problem of production downtime related to material change over, especially to a different color.

In plastic injection molding plastic pellets are pre-heated in a hopper then a screw in a heated barrel turns and strokes the material into the mold. When switching materials or colors the entire injection system needs to be dismantled to fully clean the screw, barrel, nozzle and all components that come in contact with the material. Purging techniques exist but are not sufficient to completely clear out the injection system. An injection system tear down and cleaning can typically take a full day leaving the injection molding machine unavailable for production. These same plastic molding machines are used to mold thermoset materials like liquid silicone rubber ("LSR") with some minor modifications. However, a complete tear down for cleaning is still required for both material change over and at the end of the production run since the material could cure to the point of locking the components together if left in the machine for days. Cleaning uncured thermoset material from injection components is more involved and time consuming as solvents are often needed to remove the sticky material that is comparable to tree sap.

Prior art clamping systems for plastic injection mold machines are typically servo hydraulic, servo electric systems or a combination. The systems often include toggle mechanisms for mechanical advantage when applying a clamp force. These systems are costly, large and heavy especially in presses that are 10 tons and higher. Hydraulic systems are not very energy efficient since the hydraulic pump is running all of the time. Electric servo systems have improved efficiency but often require 3 phase electric power to operate and are typically more expensive to purchase that hydraulic systems. Toggle systems add expense, weight and take up space. Generating clamp force with different mold stack up heights is further complicated since the mechanical advantage of the toggle changes with platen position. Somewhat less costly hydro-pneumatic cylinders and similar air over oil intensifier systems can provide a high clamping force without the need for toggle mechanisms but do not have any means to provide programmable motion control for opening and closing the platens. Programmable motion control of the platen is needed for many molding applications.

A need exists to have a simple compact, low cost platen clamping system that can generate clamping force and have a means for programmable motion control for opening and closing the platens including the ejection process.

SUMMARY OF THE INVENTION

The present invention provides an injection molding system generally including an injection frame and a removably attached injection module. The injection frame may include a carrier plate configured to releasably receive the injection module. The injection frame may also include various actuators that are mounted to the carrier plate to drive movable components in the injection module. The actuators and movable components may be configured to operatively interengage as the injection module is fitted into the carrier plate.

In one embodiment, the injection module may have an inlet for receiving material from an external source and an inlet valve, such as a spool valve, for selectively closing the material inlet. The carrier plate may include an actuator, such as a pneumatic cylinder, for operating the inlet valve.

In one embodiment, the injection module may include an injection rod movably seated in an injection manifold. The carrier plate may include an actuator, such as a pneumatic cylinder, for reciprocating the injection rod within the manifold. The injection module may include a nozzle and a movable needle for selectively opening and closing the nozzle. The injection module may include an actuator, such as a pneumatic cylinder, for selectable operation of the needle.

In one embodiment, the injection frame is mounted adjacent to a molding machine, such as a C-frame press. A mounting plate capable of receiving the injection molding system may be mounted to the C-frame press. The mounting plate may be adjustably secured to the C-frame press to allow adjustment of the relative position of the injection molding system with respect to the molding machine. In one embodiment, the mounting plate is mounted to the C-frame press by a plurality of bolts that pass through slots. The slots may be configured to provide the desired range of adjustability. For example, vertically extending slots may be provided to allow adjustment of the vertical position of the injection molding system with respect to the C-frame press. Additional sets of alternative slots may be provided to allow additional adjustability.

In one embodiment, one or more actuators are mounted between the injection molding system and the molding machine to move the injection molding system toward and away from a mold. For example, one or more cylinders, such as a pair of pneumatic cylinders, may be mounted between the carrier plate and the mounting plate. The cylinders may be 3-position cylinders that are capable of moving in the injection molding system between a retracted position, a vacuum position and a molding position, as described in more detail below.

In a second aspect, the present invention provides an injection molding system having a vacuum system for drawing air from the mold cavity prior to injection. In one embodiment, the vacuum system includes a vacuum sleeve that is situated about the nozzle. For example, the vacuum sleeve may be fitted coaxially about the nozzle. The inside diameter of the vacuum sleeve may be larger than the outside diameter of the nozzle to define an intermediate air flow path. A vacuum source may be coupled to the distant end of the vacuum sleeve to allow air to be drawn through the mold end of the vacuum sleeve.

In one embodiment, the vacuum sleeve extends beyond the injection nozzle in a direction toward the mold. This allows the vacuum sleeve to engage the mold before the injection nozzle as the injection molding system is shuttled toward the mold. The vacuum sleeve may include a seal on the mold end. The seal is configured to create and air tight seal between the vacuum sleeve and the mold face. In one embodiment, the vacuum seal is created around the injection nozzle inlet so that the mold cavity is in fluid communication with the vacuum sleeve. As a result, when a vacuum is applied, air is drawn from the mold cavity.

In one embodiment, the vacuum sleeve is retractable to allow it to move into the injection molding system as the injection molding system moves farther forward to bring the nozzle into engagement with the mold inlet. In one embodiment, the injection molding system includes a spring that urges the vacuum sleeve into its forward-most position, but is capable of compressing to allow the vacuum sleeve to move into a retracted position. The spring may be a coil spring that is fitted coaxially over the injection nozzle and engages the distant end of the vacuum sleeve. In an alternative embodiment, the vacuum sleeve may be immovable, but it may include a seal that is capable of compressing, collapsing or otherwise allowing the injection nozzle to move into engagement with the mold after the vacuum has been drawn.

In use, the injection molding system may be moved forward toward the mold until the vacuum sleeve, but not the nozzle tip, has engaged the mold face. In this position, the vacuum sleeve is sealed against the mold face in communication with the nozzle inlet. A partial vacuum can then be drawn at the rear end of the vacuum sleeve to extract air from the mold cavity through the runner, the mold inlet and the vacuum sleeve. While the mold cavity is held under vacuum, the injection molding system can be moved farther forward toward the mold until the nozzle tip seals against the mold face. During this second stage of travel, the vacuum sleeve remains sealed against mold face, but retracts into the injection system. Once in this position, the mold cavity is held under vacuum by the seal between the nozzle tip and the mold shut off surface. Material can be injected into the mold cavity under the aid of the partial vacuum.

In a third aspect, the injection system may include a material cartridge that includes an integrated ventilation system. In one embodiment, the material cartridge includes a piston with a ventilation cross-port and two ring seals disposed on opposite sides of the cross-port. The cross-port may be in fluid communication with a vent passage. The vent passage may pass through a rod extending out the distant end of the material cartridge. In use, pressurized air is used to move the piston forward and drive material from the material cartridge. If this pressurized air manages to bleeds through the first ring seal, it will vent through the cross-port and vent passage rather than passing through the second ring seal into the material chamber.

The present invention provides a simple and effective injection molding system that is particularly well-suited for use with liquid silicone rubber ("LSR") material. The releasably attachable injection module can be easily removed from the injection molding system, which allows it to be placed in cold storage to prevent curing of material between uses. The incorporation of actuators into the carrier plate reduces the size, weight and complexity of the injection module. It also facilitates the use of interchangeable injection modules because each injection module is not required to include its own set of actuators. Attachment and removal of the injection module can be facilitated through the use of quick attachment structures to couple the actuators to the movable components in the injection module. The vacuum system reduces the force required to inject material into the mold cavity and helps to improve part quality. Integration of a retractable vacuum sleeve provides an effective structure that is highly reliable and can operate with limited additional components. The material cartridge with integrated ventilation helps to ensure product quality by reducing the risk of pressurized air being forced into the material chamber where is can create air bubbles and otherwise impact material quality.

The present invention may be implemented in a variety of alternative embodiments with the potential to provide numerous benefits, including without limitation one or more of the following:
1. Vertical orientation with the injection point at the mold cavity parting line allows both straight molding and over molding while taking up little floor space.
2. Readily accepts self-aligning rapid tooling inserts and frames such as those made by DME and Progressive Components. No cranes need to install tools, less space required to store tools, reduced set up time.
3. Adjustable nozzle positioning and minimized distance from the injection rod to the cavity eliminates or minimizes material waste by eliminating sprue with direct to cavity injection or minimizing length of sprue. This also allows more precise dosing or "shot size" and cavity pressure for each injection. Further, the adjustable nozzle minimizes cycle time.
4. Application and measurement of vacuum at the nozzle shut off point just prior to injection allows direct vacuum and more accurate reading of the cavity pressure when the mold is fully closed and clamped. This improved vacuum can help eliminate the need for costly precision ground parting line vents to mitigate trapped air in the mold cavity while preventing flash that is especially problematic with LSR material.
5. Mold cavity inserts may be produced with ideally positioned holes to receive heater cartridges and thermocouple temperature probes that remain on the machine or come preinstalled and plug into the machine heater control system such as those made by Omega Engineering or Tempco.
6. Ideal for producing 1, 2 and 4 cavity tools depending on part geometry. The present invention may be used with tools having even more cavities in some applications.
7. Elimination of heavy mold base reduces moving mass of tooling during molding which reduces required machine power and speeds up the entire cycle time.
8. Due to the machines small footprint, if higher number of cavities are needed to produce a higher production rate this can be achieved at low capitol cost with a bank of (2 or more) machines each running a simple (1, 2 or 4 cavity) tool with one or multiple nozzles rather than a complex high cost multi-cavity tool (e.g. 8, 16, 32 cavity). Injection molding machine promotes a modular and upgradable approach to increased demand with more precise shot size control and less waste. Again, the present invention may be used with tools having even more than 4 cavities in some applications.
9. Readily adaptable for automated part removal (e.g. air gripper system pulling part off core) or manual removal.
10. A horizontal arrangement with the injection system attached to the moving platen for injection through the center of the mold cavity insert is another possible arrangement. The guidance system of the injection molding system may be a linear guidance as shown or guided on a hinged plate without detracting from the invention.
11. The injection system may receive a material feed cartridge of any size suited for a particular production or prototype run or to quick change to alternate materials or colors but material may also be continuously feed by pump and hose for longer production runs such as those sold by Fluid Automation. One advantage of the cartridge system is that the material and injection module can be cooled and stored for long periods of time without clean up.

The present invention is described with reference to various alternative embodiments. In one illustrated alternative embodiment, the present invention is incorporated into a horizontal press. In this embodiment, the present invention includes a variety of alternative components, including an alternative injection module and an alternative clamping system. Although this embodiment includes a variety of alternative components, it should be understood that these alternative components are not limited to use in connection with one another as shown and described in connection with the horizontal press embodiment, but instead may be used individually or in essentially any combination.

In one embodiment, the injection module may include an inlet valve, for example, a rotary valve for actuating the injection module. The rotary valve may have an open position and a closed position. In the open position, the injection module is in fluid communication with the external source of material so that material may be moved into the injection manifold. For example, material may be drawn into the injection manifold through retraction of an injection rod. In the closed position, the injection manifold is in fluid communication with the nozzle so that material can be ejected from the injection module into the mold. For example, material may be ejected from the injection manifold through extension of the injection rod.

In one embodiment, the injection module may include an injection manifold and a nozzle. The nozzle may be concentric with the rotary valve for a more compact design. The rotary valve may have a first end rotatably seated in the injection manifold and a second end that is coupled to and supports the nozzle. The first end of the rotary valve may be tapered and may be fitted into a tapered seat so that clamping forces assist in maintaining an adequate seal between the rotary valve and the injection manifold.

In one embodiment, the rotary valve is shaped to facilitate actuation. For example, in one embodiment, the rotary valve includes an exposed flat surface that acts as a drive surface. The portion of the rotary valve including the flat surface may be fitted into a 90-degree "scotch-yoke" or "rack and pinion" type rotary actuator.

In one embodiment, the injection module may also include an outlet valve, for example, a needle concentric with the rotary valve and the nozzle. The needle may be configured to move linearly within the rotary valve and the nozzle to selectively close the outlet end of the nozzle. The rotary valve may define a through-bore to accommodate the needle. The system may include a needle cylinder or other linear actuator to move the needle linearly between the open and closed positions. For example, the needle cylinder may be operable to move the needle into the closed position and one or more springs may be used to return the needle to the open position. More specifically, the system may include a needle spring to urge the needle away from the mold and a needle cylinder spring to urge the needle cylinder away from the mold. As an alternative, the needle cylinder may be a double-acting cylinder that extends to close the nozzle and retracts to open the nozzle.

The injection module may include an injection rod seated within the injection manifold. In operation, the injection rod is retracted to draw material into the injection manifold and extended to expel material from the injection manifold into the mold. The injection rod may be coupled to an electronically controlled injection linear actuator arrangement. If desired, the injection linear actuator arrangement may be adjustable to control injection rod stroke distance and speed. For example, in one embodiment, the injection linear actuator includes a stepper motor driving a pair of ball screws that are threadedly coupled to a rod plate. The rod plate is selectively coupled to the injection rod. For example, the exposed end of the injection rod may define an internally threaded bore and the rod plate may be joined to the injection rod by a threaded fastener. More specifically, the rod plate may define a through-hole and a shoulder screw with a knob end can be fitted through the through-hole in the rod plate and into the threaded end of the injection rod for tool-free attachment. In use, rotation of the ball screws by the stepper motor causes linear movement of the rod plate along the ball screws. Linear motion of the rod plate, in turn, results in linear motion of the injection rod within the injection manifold. It should be understood that the described linear actuator arrangement is merely exemplary and that alternative actuator arrangements may be used to move the injection rod.

In one embodiment, the injection module includes an upper manifold and a lower manifold that are separable. In one embodiment, the upper manifold and lower manifold are threaded together. The upper manifold may include the rotary valve and the lower manifold may include the injection rod. This arrangement allows different sized injection rods and cylinders to be attached to the upper manifold to obtain the desired material dosage or shot size for the part being molded.

In another aspect, the present invention may include an alternative clamping system. The alternative clamping system may include a platen linear actuator for opening and closing the mold, and a hydraulic clamping system for clamping the closed mold with the desired force. The hydraulic clamping system may include one or more hydraulic cylinders that are capable of operating in "free float" mode while the platen linear actuator is operating to open or close the mold.

In one embodiment, the platen linear actuator may be a motor and ball screw arrangement that allow permit opening and closing of the mold with essentially any motor, such as an electric motor. If desired, a stepper motor may be used to provide a linear actuator with precise control.

In one embodiment, the hydraulic clamping system includes one or more hydraulic cylinders that join the moving platen to the fixed platen or other fixed structure. For example, the hydraulic clamping system may include a pair of hydraulic cylinders disposed on opposite sides of the platen linear actuator. The hydraulic clamping system may include a valve manifold assembly that selectively connects or isolates the rod and piston sides of each cylinder. When connected, the valve manifold allows hydraulic fluid to freely flow between the piston and rod sides of the cylinder, which in turn allows the hydraulic cylinders to float with any motion provided by the platen linear actuator. When separated, the valve manifold allows normal operation of the hydraulic cylinders. In one embodiment, the hydraulic clamping system may include a reservoir that takes up excess oil displaced by the piston side of the hydraulic cylinders during opening and returns the excess oil to the piston side during closing.

In one embodiment, the valve manifold assembly includes a ball and spring arrangement that functions as a valve that can close to prevent oil flow going from the piston side to both the reservoir and to the rod side of the cylinders. The valve manifold assembly further includes an actuator that can selectively unseat the ball when it is desirable for the hydraulic cylinders to enter "free float" mode. In one embodiment, the valve actuator is an air cylinder with a plunger that can be activated to push the ball off of its seat allowing the free flow of oil between the piston and rod sides of the cylinder.

In one embodiment, the piston side of hydraulic cylinders may be operated by an oil pressure intensifier when the valve is closed. The oil pressure intensifier may be an air/oil intensifier, such as a 40:1 air/oil intensifier unit capable of generating about 3200 psi of oil pressure using about 80 psi of air pressure. The combination of this hydraulic circuit and programmable linear motion provides a smaller, lower cost and more energy efficient high tonnage clamping system than the prior art machines. The low cost, lower force programmable platen linear actuator can operate all aspects of the molding process except clamping from 120 volt single phase electric power. The air/oil intensifier provides the clamping tonnage needed with low cost readily available air pressure without the need of toggle mechanisms. The arrangement is chosen to save space and use conventional cylinders. This configuration is merely exemplary. For example, a single hydraulic, multiple or integrated tie rod hydraulic cylinders could be used in other embodiments.

These and other features of the invention will be more fully understood and appreciated by reference to the description of the embodiments and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

BRIEF DESCRIPTION OF THE DRAWINGS

FIG. 1A is a front view of an injection molding machine incorporating an injection molding system in accordance with an embodiment of the present invention.

FIG. 1B is a sectional view of a portion of the molding machine taken along line A-A of FIG. 1A FIG. 2 is a perspective view of the injection molding machine.

FIG. 3 is a front view of the injection molding machine.

FIG. 4 is an enlarged perspective view of Area A of FIG. 2.

FIG. 12 is a front view of a portion of the injection molding machine.

FIG. 13 is a sectional view of a portion of the injection molding machine taken along line A-A of FIG. 12.

FIG. 14 is a sectional view of a portion of the injection molding machine similar to FIG. 13.

FIG. 15 is an enlarged view of Area D of FIG. 14 showing the mold closed with the nozzle and vacuum sleeve removed.

FIG. 16 is an enlarged view similar to FIG. 15 showing the vacuum sleeve and nozzle in the vacuum position.

FIG. 17 is an enlarged view similar to FIG. 15 showing the vacuum sleeve and nozzle in the injection/molding position.

FIG. 20 is a side view of the injection molding system.

FIG. 21A is a side view of the injection module.

FIG. 21B is a rear view of the injection molding system with the injection module removed.

FIG. 22A is an exploded side view of the injection molding system with the injection module removed.

FIG. 22B is an exploded top view of the injection molding system with the injection module removed.

FIG. 23 is a sectional view of the injection module taken along line F-F of FIG. 22B.

FIG. 24 is a sectional view of the injection module taken along line D-D of FIG. 22A.

FIG. 25 is an enlarge view of a portion of the injection molding machine showing the vacuum assembly.

FIG. 26 is a top, right perspective view of an alternative injection molding machine with a mold installed in accordance with an alternative embodiment.

FIG. 27 is a top, left perspective view the alternative injection molding machine with the mold and mold clamps removed from the injection molding machine.

FIG. 28 is a front view of the alternative injection molding machine with a mold installed and in the open position.

FIG. 29 is a top view of the alternative injection molding machine with a mold in the closed position.

FIG. 30 is a sectional view of the injection molding machine with the mold in the closed, vacuum position.

FIG. 31 is an enlarged view of area 30 of Fig. showing the injection system in the vacuum position.

FIG. 32 is an enlarged view similar to FIG. 31, except showing the injection system in the injection position.

FIG. 33 is a sectional front view of the injection molding machine with the mold in the open position and the ejector plate of the mold being pushed by the ejector post.

FIG. 34 is a perspective view of the injection system.

FIG. 37 is a perspective view of the injection module.

FIG. 38 is a front sectional view of the injection module.

FIG. 39 is a top sectional view of the injection module.

FIG. 43 is a perspective view of the molding machine with portions removed to show the platen linear actuator.

DESCRIPTION OF CURRENT EMBODIMENTS

Overview

Figure 6:
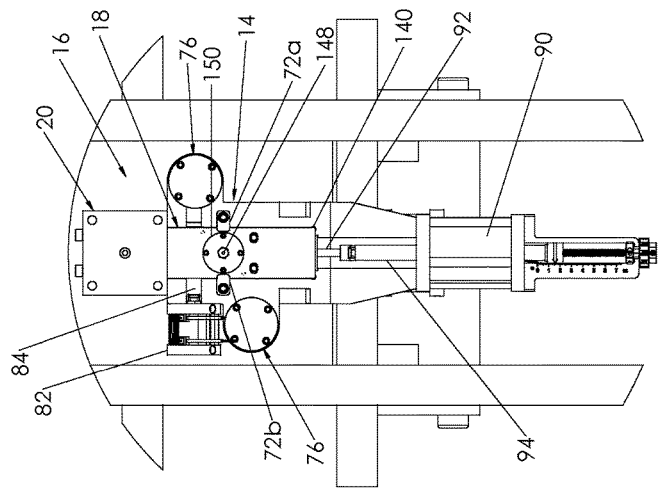
FIG. 6 is an enlarged view of Area B of FIG. 7.
Figure 7:
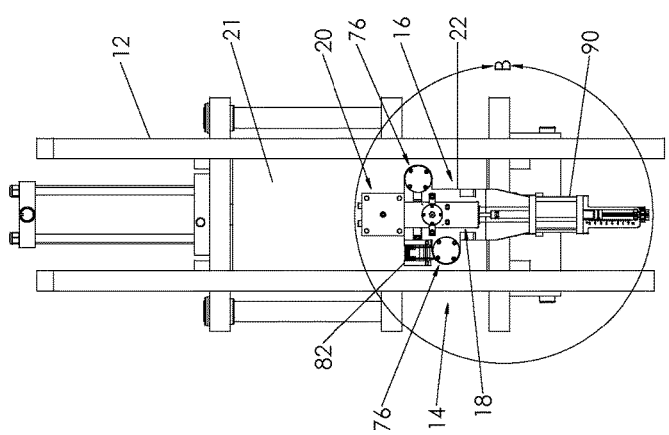
FIG. 7 is a rear view of the injection molding machine.
Figure 5:
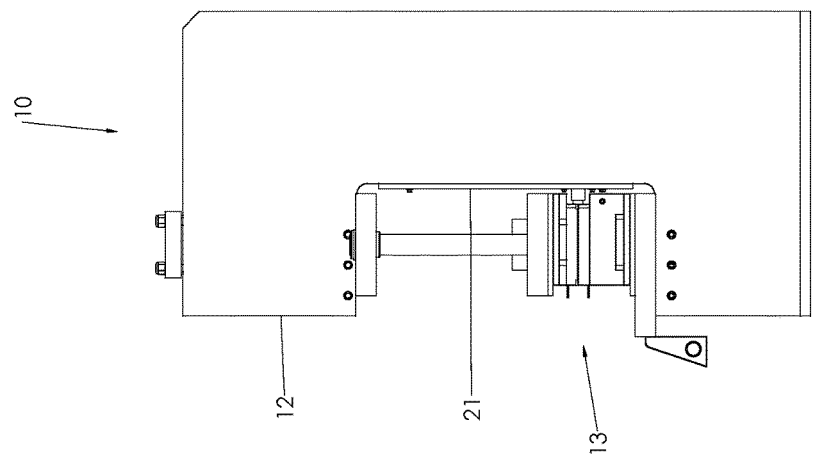
FIG. 5 is a side view of the injection molding machine.

An injection molding machine in accordance with an embodiment of the present invention is shown in FIGS. 1-7, and generally designated 10. The injection molding machine 10 generally includes a C-frame press 12 and an injection molding system 14. The C-frame press 12 is generally conventional and includes a mold 13 that defines a mold cavity 15 for forming the desired part. The injection molding system 14 is movably mounted to the C-frame press 12 and is configured to selectively inject material into the mold cavity 15. The injection molding system 14 generally includes an injection frame 16, an injection module 18 and a material cartridge 20. The injection frame 16 generally includes a carrier plate 22 and a plurality of actuators 76, 82, 90 and 150 that are configured to move the injection frame 16 toward and away from the mold 13 and to operate the various parts of the injection module 18. The injection module 18 is releasably attached to the carrier plate 22. The injection module 18 includes at least a portion of the material flow path from the material cartridge 20 to the mold 13, including the nozzle 32 and the nozzle tip 34. When desired, the injection module 18 can be removed from the injection frame 16. This allows the injection module 18 to be placed in a refrigerated location where the material inside the injection module 18 will not cure for extended period of time. The injection molding system 14 may also include a vacuum system 36 for drawing air from the mold cavity 15 prior to injection. In this embodiment, the vacuum system 36 includes a vacuum sleeve 38 that is situated about the nozzle 32. The vacuum sleeve 38 extends forwardly beyond the nozzle 32 so that the vacuum sleeve 38 contacts the mold 13 prior to the nozzle tip 34. The vacuum system 36 also includes a vacuum source (not shown) for applying a partial vacuum to the vacuum sleeve 38. In the illustrated embodiment, the vacuum sleeve 38 is retractable with respect to the nozzle 32. The injection molding system 14 of the illustrated embodiment includes a spring 40 that urges the vacuum sleeve 38 into its forward-most position, while allowing the vacuum sleeve 38 to move rearwardly as the injection frame 16 is moved from the vacuum position to the injection position. In use, the injection frame 16 may be moved toward the mold into the vacuum position in which the vacuum sleeve 38, but not the nozzle 32, is engaged with the mold 13. In this position, the vacuum source may be operated to create a partial vacuum within the mold cavity 15. While the mold cavity 15 is held under vacuum, the injection frame 16 can be moved farther toward the mold 13 until the nozzle tip 34 seals against the mold face. During the second stage of travel, the vacuum sleeve 38 remains sealed against the mold face while retracting into the injection frame 16 as spring 40 is increasingly compressed. Once the injection frame 16 has been moved into the injection position, material can be injected into the mold cavity 15 with the aid of the partial vacuum. In the illustrated embodiment, the material cartridge 20 includes an integrated ventilation system. The illustrated material cartridge 20 generally includes a piston 42 that is situated inside a cylindrical sleeve 44 and divides the cartridge 20 into a material chamber 46 and a pressurized air chamber 48. The piston 42 includes two rings seals 50 and 52 arranged on opposite sides of a cross-port 54. A rod 56 extends rearwardly from the piston 42 through the end wall 58 of the material cartridge 20. The rod 56 defines an internal vent passage 60 that is in fluid communication with the cross-port 54. In use, if pressurized air manages to bleed through ring seal 50, it will vent to the environment through the cross-port 54 and the vent passage 60. This will reduce the risk that pressurized air will leak into the material chamber 46 and impact material quality.

Although the present invention is described in the context of a conventional C-frame press, it should be understood that the present invention can be incorporated into a wide range of molding machinery, including a variety of alternative vertical and horizontal presses. The various cylinders incorporated into the present invention may be pneumatic cylinders, hydraulic cylinders or essentially any other actuators capable of providing reciprocating motion.

Directional terms, such as "vertical," "horizontal," "top," "bottom," "upper," "lower," "inner," "inwardly," "forward," "rearward," "outer" and "outwardly," are used to assist in describing the invention based on the orientation of the embodiments shown in the illustrations. The use of directional terms should not be interpreted to limit the invention to any specific orientation(s).

General Construction and Operation.

As noted above, the injection molding system 14 may be incorporated into a wide variety of injection molding machinery with different press and mold assemblies. For purposes of disclosure, the injection molding system 14 is described in connection with a C-frame press 12 using a mold 13 that is assembled formed from self-aligning rapid tooling inserts and frames, such as those made by DME and Progressive Components. Given that the C-frame press 12 and mold assembly are generally conventional, they will not be described in great detail. Referring now to FIGS. 2-4, the injection molding machine 10 of the illustrated embodiment generally includes a vertically-oriented C-frame press 12, a bolster plate 100, a bottom insulator plate 102, a mold cavity insert frame 104, a bottom cavity insert 106, a top cavity insert 108 and a top insulator plate 110, and a top plate 112. A plurality of heater cartridges 114a-d may be fitted into the bottom cavity insert 106 and the top cavity insert 108. The heater cartridges may be replaced by other heating apparatus, such as heating platens or other similar structures. In the illustrated embodiment, the mold assembly also includes a cavity core/ejector pin assembly 116 that is coupled to an ejector plate 118. The ejector plate 118 is movable by operation of an ejector cylinder 120 mounted to the undersurface of the bolster plate 100. In use, the ejector cylinder 120 may be extended to move the ejector plate 118 and consequently the cavity core/ejector pin assembly 116 to lift a molded part from the mold cavity 15.

Referring now to FIG. 6-13, the injection molding system 14 generally includes an injection frame 16, an injection module 18 and a material cartridge 20. The injection frame 16 generally includes a mounting plate 21, a carrier plate 22 and a plurality of actuators 76, 82, 90 and 150 that are configured to move the injection frame 16 toward and away from the mold 13 and to operate the various parts of the injection module 18. The mounting plate 21 of the illustrated embodiment is a generally rectangular plate having four mounting slots 62a-d for securing the mounting plate 21 to the C-frame press 12 using bolts 64a-d. The slots 62a-d allow the vertical position of the mounting plate 21, and consequently the injection molding system 14, to be adjusted with respect to the C-frame press 12 and the mold 13.

The carrier plate 22 defines a seat 66 for receiving the injection module 18. A pair of guideposts 68a-b may extend from the seat 66 where they can be received in corresponding guide slots 70a-b defined in the injection module 18. The carrier plate 22 may also include a pair of swing clamps 72a-b that can be used to secure the injection module 18 in the seat 66. The swing clamps 72a-b may be supplemented or replaced by other attachment structure, such as latches or fasteners. The carrier plate 22 may define a nozzle aperture 74 that allows the nozzle 32 to extend through the carrier plate 22 from the injection module 18.

The injection frame 16 includes a pair of 3-position cylinders 76 that are configured to move the injection frame 16 with respect to the mounting plate 21. As perhaps best shown in FIGS. 8 and 19, the 3-position cylinders 76 are secured to the carrier plate 22. The rods 78 extend through bushings 79 in the carrier plate 22 and are joined to the mounting plate 21 by bolts 80. More specifically, in the illustrated embodiment, the free end of each rod 78 is drilled and tapped to receive bolts 80. During assembly, bolts 80 are fitted through openings in the mounting plate 21 and threaded into the rods 78. This secures the injection frame 16 to the mounting plate 21 in a way that allows the injection frame 16 to be moved forwardly and rearwardly with respect to the mounting plate 21, and consequently the C-frame press 12 and the mold 13.

Figure 8:
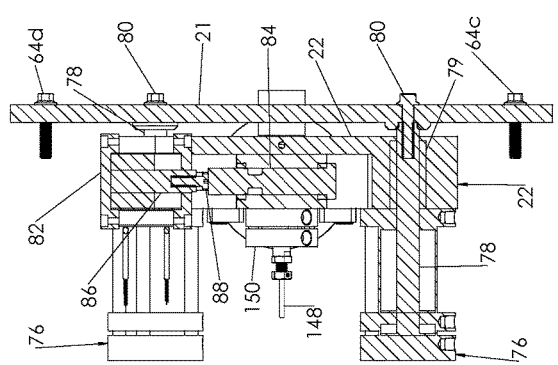
FIG. 8 is a sectional view taken along line G-G of FIG. 9.
Figure 19:
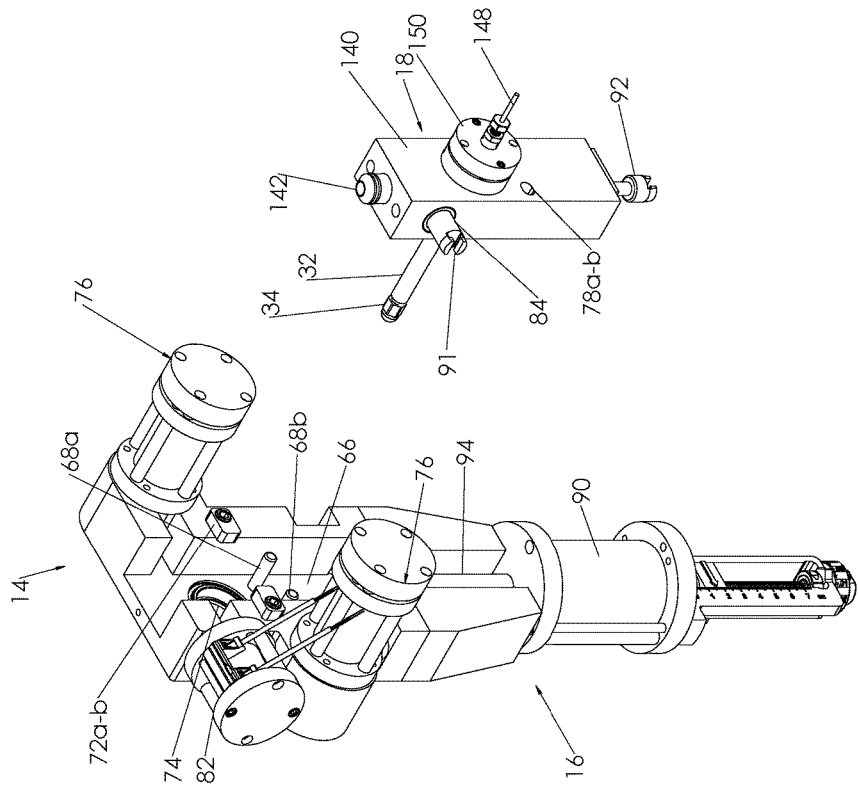
FIG. 19 is an exploded view showing the injection module removed from the injection molding system.
Figure 18:
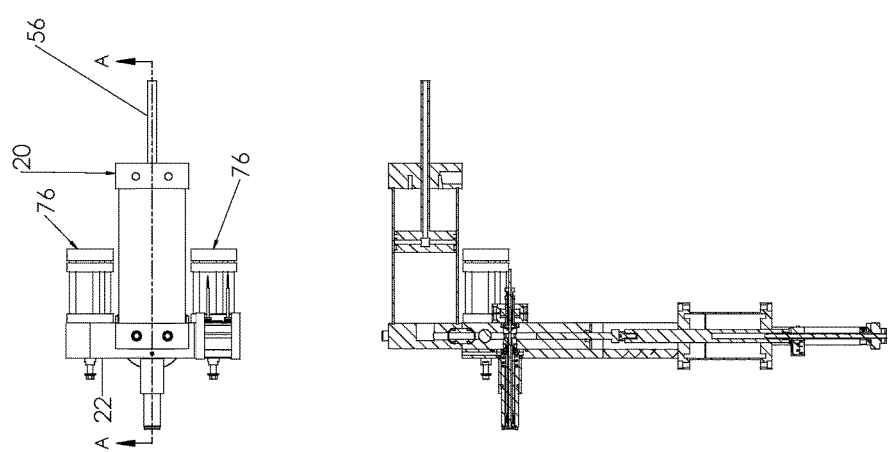
FIG. 18 is a sectional view of a portion of the injection molding system.
Figure 36:
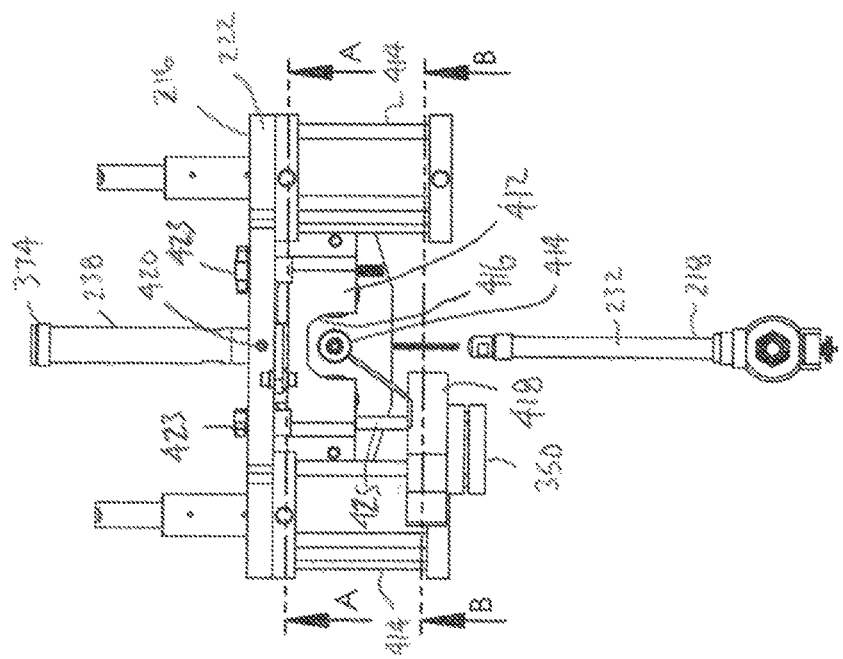
FIG. 36 is a partially exploded top view of the injection system showing the injection module removed.

The injection frame 16 also includes a spool valve cylinder 82 that is configured to operate the spool valve 84 in the injection module 18. Referring now to FIGS. 8 and 19, the spool valve cylinder 18 is capable of reciprocating motion that allows it to open and close spool valve 84. The spool valve cylinder 82 includes a rod 86 that terminates in a head 88, such as a bolt threaded into the end of the rod 86. The head 88 is configured to operatively interfit with a T-slot 91 defined in the mating end of the spool valve 84 (See FIG. 19). This allows the spool valve cylinder 82 to be quickly and easily coupled to the spool valve 84 when the injection module 18 is seated in the carrier plate 22. The spool valve 84 may be replaced by a different type of valve. In such applications, the spool valve cylinder 82 may be replaced by an actuator appropriate for the replacement valve. For example, a rotating actuator may be provided for a valve that rotates rather than moves linearly between open and closed positions.

Figure 11:
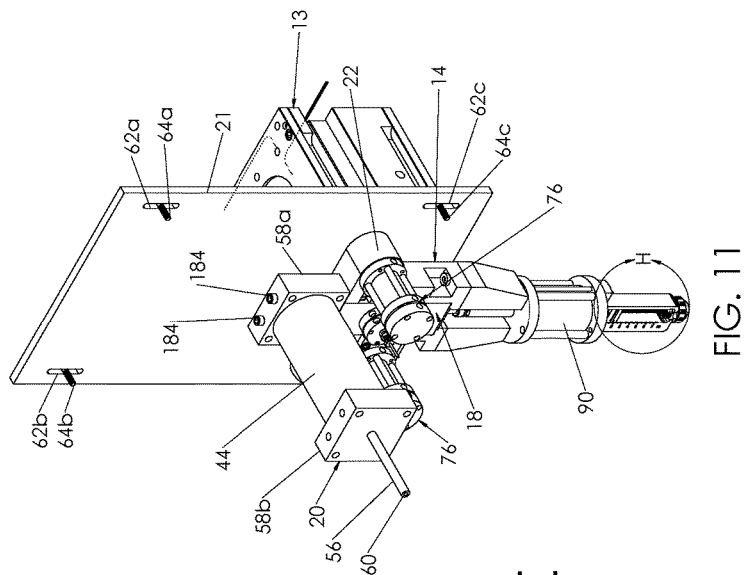
FIG. 11 is a perspective view of a portion of the injection molding machine.
Figure 10:
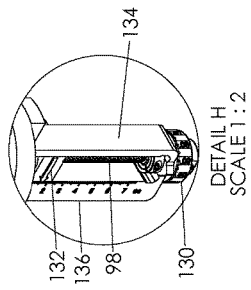
FIG. 10 is an enlarged view of Area H of FIG. 11.
Figure 9:
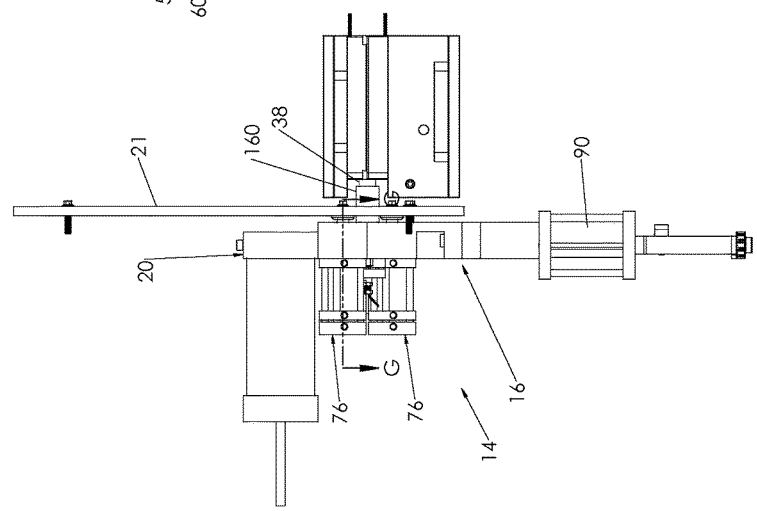
FIG. 9 is a side view of a portion of the injection molding machine.

The injection frame 16 also includes an injection cylinder 90 that is configured to operate the injection rod 92 in the injection module 18. Referring now to FIGS. 6, 11 and 13, the injection cylinder 90 is mounted for vertical reciprocating motion that allows it to extend and retract the injection rod 92. The injection cylinder 90 includes a rod 94 that terminates in a head 97, such as a bolt threaded into the end of the rod 94. The head 97 is configured to operatively interfitted with a T-slot 96 defined in the mating end of the injection rod 92. This allows the injection cylinder 90 to be quickly and easily coupled to the injection rod 92 when the injection module 18 is seated in the carrier plate 22. The injection cylinder 90 may be fitted with an adjustment system that allows control over the travel of the injection rod 92. As perhaps best shown in FIGS. 10 and 13, the adjustment system generally includes a threaded rod 98 that extends vertically into a vertical bore in rod 94. A graduated adjustment knob 130 is secured to the bottom end of the threaded rod 98. An adjustment nut 132 may be threadedly fitted over the threaded rod 98 and is prevented from rotating by a housing 134 that includes a graduated shot size readout 136. In use, the graduated adjustment knob 130 may be rotated to control the position of the adjustment nut 132 along threaded rod 98. The adjustment nut 132 functions as a stop to limit downward movement of rod 94, and consequently injection rod 92. If desired, a limit switch 138 can be mounted to the adjustment nut 132 to provide a signal to the control system when the injection rod has been fully retracted.

As noted above, the injection module 18 forms a significant portion of the material flow path from the material cartridge 22 to the mold 13. The injection module 18 will be described in more detail with reference to FIGS. 23 and 24. The injection module 18 generally includes a manifold 140 that seats the spool valve 84, the nozzle 32, the injection rod 92 and a fitting 142 for coupling with the material cartridge 20. The spool valve 84 is fitted within through-bore 144 and includes seals 146 toward opposite ends. The nozzle 32 is part of a nozzle assembly that includes the nozzle tip 34, a needle 148 mounted within the nozzle 32 and a needle cylinder 150 for moving the needle 148 within the nozzle 32. The rear end of the nozzle assembly may include a threaded adjustment mechanism for adjusting the position of the needle 148 with respect to the nozzle 32. The nozzle assembly is fitted through a through-bore 151. The injection rod 92 is movably mounted within through-bore 152. Through-bore 152 extends vertically through the manifold 140 intersecting with through-bore 151 (which seats the nozzle assembly) and through-bore 144 (which seats the spool valve 84). A seal 154 and seal plate 156 may be fitted to the manifold 140 at the bottom end of through-bore 152. The upper end of through-bore 152 is counter bore 153 to receive fitting 142. The fitting may include O-ring seals 158 at opposite ends.

As described above, the injection molding system 14 may include a vacuum system 36 that can be used to draw a vacuum in the mold cavity 15. Referring now to FIG. 25, the vacuum system 36 generally includes a vacuum sleeve 38, a spring 40, a collar 160 and a vacuum source (not shown). The vacuum sleeve 38 is situated about the nozzle 32 within the collar 160. For example, the vacuum sleeve 38, nozzle 32 and collar 160 may be concentrically aligned. Collar 160 may include a cross bore 162 that is in fluid communication with a vacuum entry passage 164 in the carrier plate 22. A seal 166 may be fitted between the collar 160 and the carrier plate 22. The collar 160 is secured to the carrier plate 22. Another seal 168 may be fitted between the carrier plate 22 and the injection module 18. A third seal 170 may be fitted between the vacuum sleeve 38 and the collar 160. The spring 40 may be positioned between the vacuum sleeve 38 and the injection module 18 to urge the vacuum sleeve 38 forward toward the mold 13. The mold end of the vacuum sleeve 38 may include a seal 174 capable of creating a leaktight interface between the vacuum sleeve 38 and the mold face.

As noted above, the material cartridge 20 includes an integrated ventilation system (See FIGS. 1B, 13 and 14). The illustrated material cartridge 20 generally includes a cylindrical sleeve 44 that is closed on opposite ends by forward end cap 58a and rear end cap 58b. A piston 42 that is movably situated inside the cylindrical sleeve 44 to divide the interior of the cartridge 20 into a material chamber 46 and a pressurized air chamber 48. The piston 42 includes two rings seals 50 and 52 arranged on opposite sides of a cross-port 54. A rod 56 extends rearwardly from the piston 42 through the rear end cap 58b of the material cartridge 20. The rod 56 defines an internal vent passage 60 that is in fluid communication with the cross-port 54. In use, if pressurized air manages to bleed through ring seal 50, it will vent to the environment through the cross-port 54 and the vent passage 60. This will reduce the risk that pressurized air will leak into the material chamber 46 and impact material quality. The forward end cap 58a may define a passage 180 that provides a flow path for material to flow from material chamber 46 to fitting 142. The forward end cap 58a may also include through-bores 182 that allow the material cartridge 20 to be secured to the top of the injection module 18 over fitting 142 by bolts 184. The material cartridge 20 may be replaced by other sources of material.

In use, the injection molding system 14 is movable between a retracted position, a vacuum position and an injection position. In the retracted position, the nozzle 32 and vacuum sleeve 38 are moved rearwardly away from the mold 13. In the vacuum position (shown in FIG. 16), the injection molding system 14 is moved forwardly toward the mold 13 to bring the vacuum sleeve 38 into contact with the face of the mold 13. In this position, seal 174 creates a seal between the vacuum sleeve 38 and the mold 13. In this position, a vacuum can be drawn by the vacuum source (not shown), which draws air out of the mold cavity 15 through the vacuum sleeve 38, cross bore 162 and vacuum entry passage 164. A pressure switch (not shown) may be included to indicate when an appropriate vacuum has been achieved. Once the mold cavity 15 is under sufficient vacuum, the injection molding system 14 can be moved into the injection position shown in FIG. 17. In this position, the nozzle tip 34 is directly engaged with the mold inlet creating a leaktight seal that allows material to be injected into the mold cavity 15. It should also be noted that, in this position, the vacuum sleeve 38 has retracted into the collar 160. More specifically, forward movement of the injection molding system 14 may move the vacuum sleeve 38 rearwardly by compressing spring 40.

Alternative Embodiment

As described above, the present invention may be implemented in a wide variety of alternative embodiments. For example, an alternative embodiment is illustrated in FIGS. 26-45. In this embodiment, the injection molding machine 210 generally includes a mold press 212 (also commonly referred to as a "die set"), an injection system 214 and a clamping system 300 (See, for example, FIGS. 26-29). The mold press 212 generally includes a pedestal 402, a first fixed end platen 404 mounted atop the pedestal 402 for supporting the clamping system 300, a second fixed injection platen 406 mounted atop the pedestal 402 for supporting the "A-side" of the mold assembly and the injection system 214, a plurality of platen support rods 408a-d extending between the first fixed platen 40 and the second fixed platen 406, and a movable platen 410 movably mounted to the platen support rods 408a-d to support the "B-side" of the mold assembly. The clamping system 300 is configured to open and close the mold press 212 and consequently the mold assembly (Compare FIGS. 28 and 33 with FIGS. 29 and 30), The machine 210 is shown in FIG. 26 with the mold assembly and in FIG. 27 without the mold assembly. The illustrated mold press 212 is merely exemplary, and the present invention may be implemented using other types or styles of presses that might interface with an injection system or clamping system according to the present invention. Further, the present invention is described in the context of a mold assembly having a pair of mold parts 306 and 308 that, when closed, cooperatively define a mold cavity having the shape of the desired molded article. The present invention may, however, be incorporated into injection molding machines that include other types of mold assemblies, including different numbers and combinations of mold parts. For example, although not shown, the mold may include heaters cartridges.

As noted above, the injection system 214 is mounted to the first fixed platen 404 and is configured to inject material into the mold cavity and, optionally, to draw a partial vacuum in the mold cavity. In this embodiment, the injection system 214 generally includes an injection frame 216 that is mounted to the injection platen 406 and an injection module 218 that is removably attachable to the injection frame 216 (See FIGS. 34-36). The injection frame 216 of the illustrated embodiment generally includes a carrier plate 222 and a module mount 412. The carrier plate 222 is operatively coupled to the injection platen 406 by a pair of pneumatic cylinders 414 that can be extended and retracted to move the carrier plate 222, and consequently the injection system 214 toward and away from the mold. The pneumatic cylinders 414 may be replaced by essentially any other actuator(s) capable of selectively moving the injection module 218 into engagement with the material inlet on the mold. For example, the pneumatic cylinders may be replaced hydraulic cylinders or by a motor and linear drive arrangement. Further, other arrangements could move the mold towards a fixed-position injection module or the injection module could be held against the mold at all times if desirable. Such could be the case with room temperature UV cured material.

In this embodiment, the injection system 214 includes a vacuum system for drawing air from the mold cavity prior to injection. In the illustrated embodiment, a vacuum seal is created at the mold cavity material inlet so that the mold cavity can be placed in fluid communication with the vacuum source. As a result, when a vacuum is applied and the mold is closed fully, air is drawn from the mold cavity. As can be seen, the vacuum arrangement allows creation of a partial vacuum in the mold cavity by drawing air through the very channels in the mold through which material normally enters the mold cavity. In the illustrated embodiment, the vacuum system is integrated into the carrier plate 222. As shown, the carrier plate 222 of the illustrated embodiment defines a vacuum port 420 and includes vacuum sleeve 238 (See FIG. 34). The vacuum port 420 is in fluid communication with the interior of the vacuum sleeve 238 so that a vacuum source (not shown) connected to the vacuum port 420 will draw a vacuum within the interior of the vacuum sleeve 238 (See FIG. 33). The vacuum sleeve 238 defines an interior capable of receiving the nozzle 232 when the injection module 218 is attached to the injection frame 216. In this embodiment, the vacuum sleeve 238 includes a flexible, resilient tip 374 capable of creating a leaktight interface between the vacuum sleeve 38 and the mold face when in both the vacuum and injection positions (as described in more detail below). The vacuum sleeve tip 374 may be rubber or essentially any other material capable of providing a leaktight seal in the vacuum and injection positions. Although the illustrated embodiment includes a vacuum sleeve 238 disposed about the nozzle 232, this configuration is merely exemplary and the vacuum system may include essentially any alternative arrangements capable of coupling a vacuum source to the material inlet of the mold. For example, instead of a vacuum sleeve disposed coaxially about the nozzle, the vacuum system may include alternative structure capable of being operatively coupled to a vacuum source and of creating a vacuum seal at the material inlet. For example, the alternative structure may include a vacuum outlet, such as air line or other fluid flow path, that is physically separate from the nozzle or that is integrated with the nozzle in an arrangement different from that of the illustrated coaxial vacuum sleeve 238. It should also be noted that a vacuum system in accordance with the present invention may be integrated into essentially any injection system and is not limited to use with an injection system having a removably attachable injection module.

In this embodiment, the module mount 412 is secured to the carrier plate 222 and provides a mounting structure for the injection module, the injection rod actuator, the needle actuator and the injection module valve actuator. As perhaps best shown in FIGS. 35 and 36, the module mount 412 of this embodiment includes a seat 416 for removably receiving the injection module 218. The module mount 412 and carrier plate 222 define openings that allow the nozzle 232 to be fitted into the interior of the vacuum sleeve 238. The module mount 412 includes a module clamp 418 for securing the injection module 218 in the seat 416. The module clamp 418 may be secured in the closed position by a pair of clamp screws 423 that extend through the module mount 412 and the carrier plate 222. The clamp screws 423 may include knobs to facilitate manual rotation of the screws 423.

In this embodiment, the module clamp 418 is captivated on a clamp guide bolt 425. The needle actuator may be fixed to the module clamp 418. For example, in the illustrated embodiment the needle actuator is a pneumatic cylinder 350 that is secured to the module clamp 418. The needle cylinder 350 may be movable between a retracted position in which the needle 348 is in the open position and an extended position in which the needle 348 is in the closed position. The needle cylinder 350 may include a spring that biases the needle cylinder 350 in the retracted position. The needle cylinder 350 may be replaced by other linear actuators capable of providing the desired movement to the needle 348.

Figure 35:
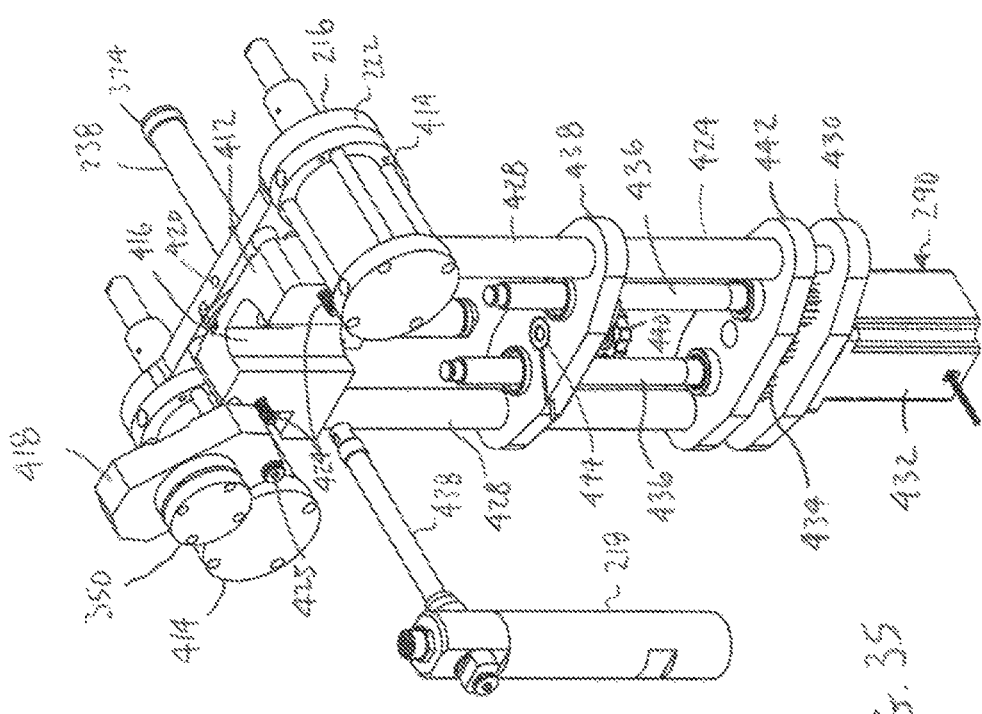
FIG. 35 is a partially exploded perspective view of the injection system showing the injection module removed.
Figure 40:
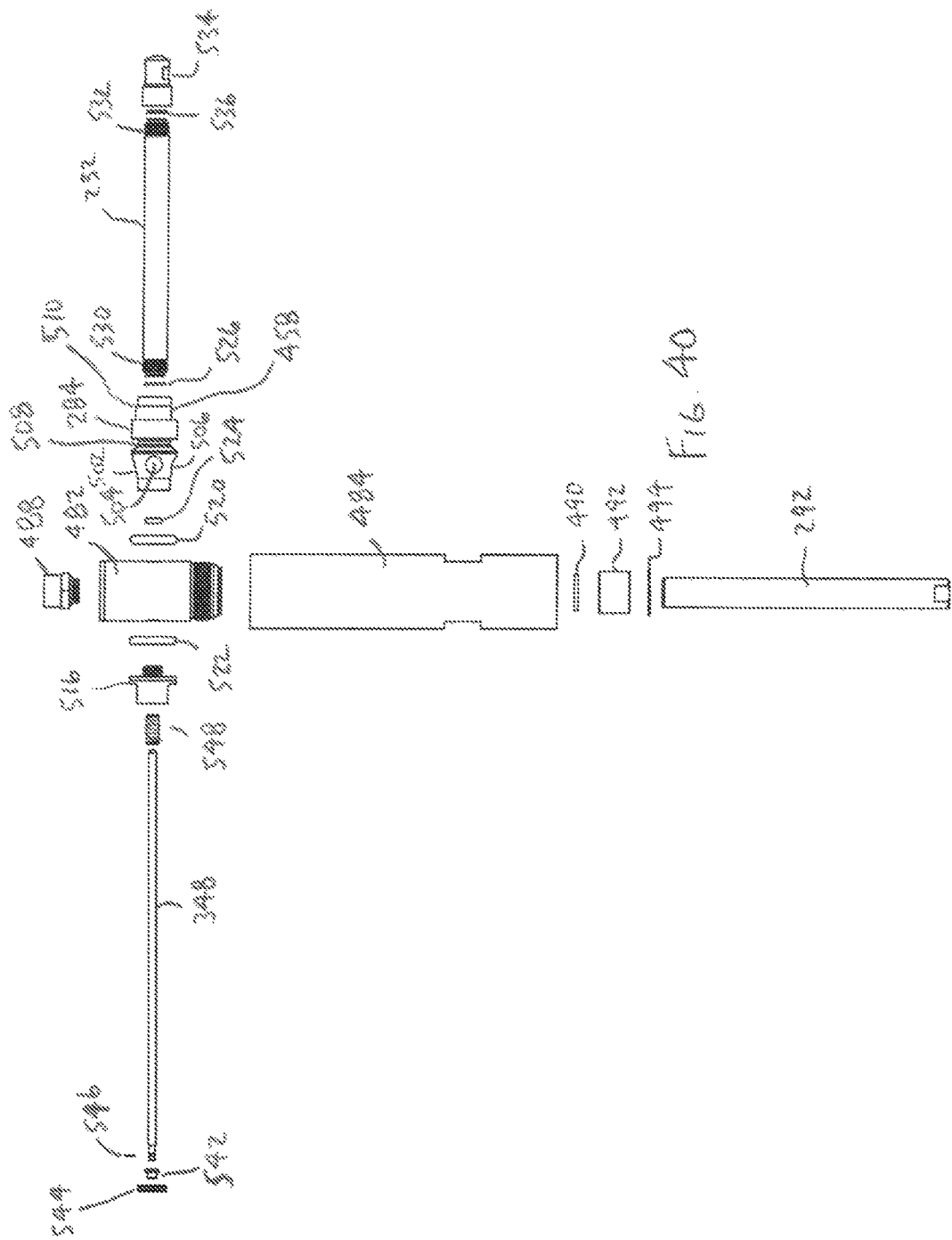
FIG. 40 is an exploded view of the injection module.
Figure 42:
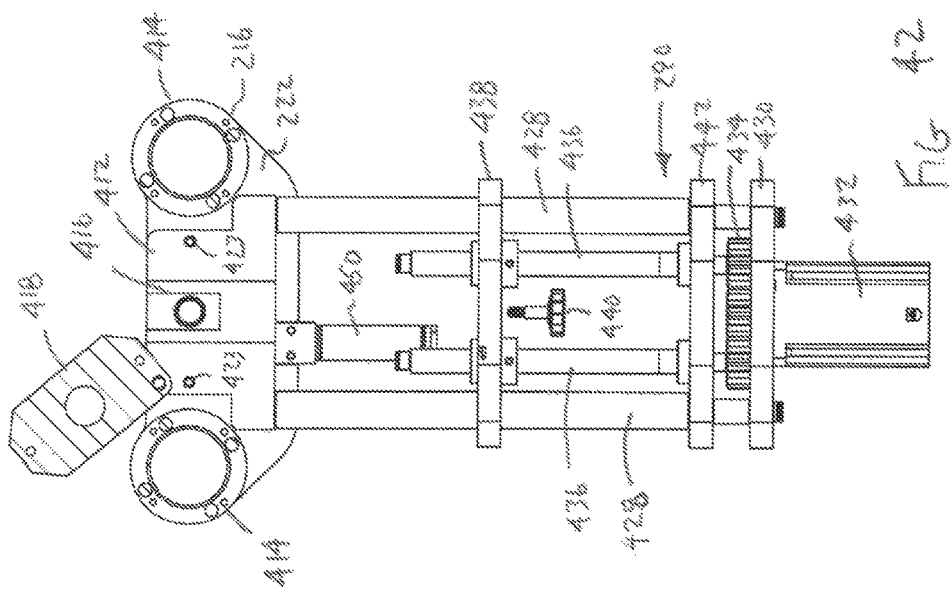
FIG. 42 is a partially exploded, left side sectional view of a portion of the injection system taken along line 42-42 of FIG. 36 showing the injection rod connecting screw removed from the rod plate.

In this embodiment, the module mount 412 also includes an injection rod actuator assembly 424 that includes the injection rod actuator 290 and associated support structure. The support structure of this embodiment generally includes a pair of support rods 428 that are coupled to a motor mounting plate 430. The injection rod actuator 290 of this embodiment generally includes a motor 432, a gear assembly 434, a pair of ball screws 436, a rod plate 438 and a rod connecting screw 440. The motor 432 is mounted to the undersurface of the mounting plate 430. The gear assembly 434 is mounted between the mounting plate 430 and a gear plate 442. The ball screws 436 are mounted to the gear assembly 434 and extend through corresponding openings in the gear plate 442. The rod plate 438 is slidably fitted over the support rods 428 and threadedly engaged with the ball screws 436. The rod plate 438 is coupled to the injection rod 292 by passing the rod connecting screw 440 through an opening in the rod plate 438 and threadedly connecting it to the injection rod 292, for example, by threaded fitting the screw 440 into a thread bore in the end of the injection rod 292. In operation, rotation of the motor 432 is communicated to ball screws 436 by gear assembly 434. The rod plate 438 is threadedly interfaced with the ball screws 436 so that rotation of the ball screws 436 imparts linear movement of the rod plate 438 along the ball screws 436. As noted above, the rod plate 438 is secured to the injection rod 292 by the connecting screw 440 so that movement of the rod plate 438 is imparted to the injection rod 292. In this embodiment, the motor 432 is an electric stepper motor. The injection rod actuator of this embodiment is merely exemplary and it may be replaced by essentially any other linear actuator capable of providing the injection rod with the desired motion, which in this embodiment is reciprocating linear motion. If desired, the injection rod actuator may also include a load cell configured to allow the control system to dynamically measure force applied to the injection rod 292 to derive injection pressure for a specific diameter injection rod 292. For example, as shown in FIG. 35, a load cell washer 444 may be fitted between the rod plate 439 and the injection rod 292. The load cell washer may be replaced by other types of sensors and may be eliminated in those applications where it is unnecessary.

Figure 41:
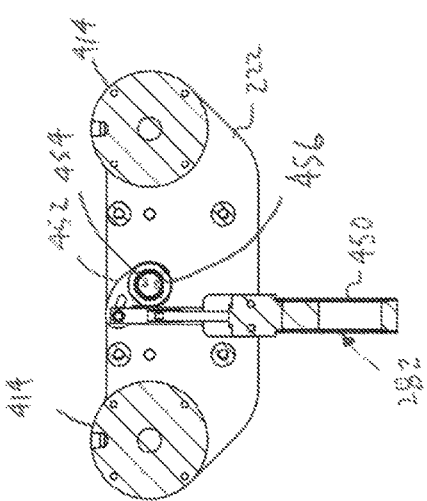
FIG. 41 is a sectional left side view of a portion of the injection system taken along line 41-41 of FIG. 36 showing the rotary valve actuator.

In the illustrated embodiment, the module mount 412 also carries the injection module valve actuator 282. The injection module 218 of the illustrated embodiment includes a rotary valve 284 that is movable between load and inject positions through rotational movement. Accordingly, the injection module valve actuator 282 is configured to provide selective rotational movement of the rotary valve 284. Referring now to FIG. 41, the illustrated injection module valve actuator 282 generally includes a pneumatic cylinder 450 and a 90-degree rotary actuator (such as a scotch-yoke) 452. The rotary actuator 452 includes a keyway 454 that receives and engages a drive portion of the rotary valve 284.

For example, in the illustrated embodiment, the keyway 454 and the rotary valve 284 each include a drive flat 456 and 458, respectively. When the injection module 218 is properly installed in the module mount 412, the rotary valve 284 is seated in the rotary actuator keyway 454 with the drive flat 456 and 458 operatively engaged. Seals (not shown) are used to create a leak tight connection between the rotary actuator 452 injection module 218 and carrier plate 222 and module mount 412 so that a vacuum connection may be created between the vacuum port 420 and the vacuum sleeve 238. The illustrated injection module valve actuator 282 is merely exemplary and it may be replaced by other actuators configured to operate the valve. For example, other types of rotary valve actuators may be used. As another example, a linear actuator may be used when the injection module 218 includes a linear valve (rather than rotary valve). In some applications, no valve actuator may be necessary. For example, the injection module valve arrangement may include one or more directional valves (e.g. a spool valve or rotary valve) or it may include one or more check valves. In an alternative embodiment, one check valve (not shown) may be provided to allow material to be drawn into the manifold as the injection rod 292 is retracted and a second check valve (not shown) may be provided to allow material to be ejected from the manifold through the nozzle 232 when the injection rod 292 is extended.

In the illustrated embodiment, the injection module 218 is removably attachable to the injection frame 216. This allows the injection module 218 to be removed for cleaning and allows installation of interchangeable injection modules 218 on the same machine. In the illustrated embodiment, the injection module 218 generally includes a manifold assembly 480 (also known as a barrel), an injection rod 292, a nozzle 232, a rotary valve 284 and a needle 348 (See FIGS. 37-40). The manifold assembly 480 of the illustrated embodiment includes an upper manifold 482 and a lower manifold 484 that are removably joined. The upper manifold 482 and lower manifold 484 are threaded together in this embodiment, but other types of connections may be employed, such as a bayonet connection. In some applications, the manifold assembly 480 may be replaced by a single one-piece manifold. In the illustrated embodiment, the upper manifold 482 defines a material inlet 486. The material inlet 486 may be fitted with a material inlet fitting 488. The injection rod 292 may be fitted within an internal bore in the lower manifold 484. In this embodiment, a seal 490, bushing 492 and retaining ring 494 are fitted into the internal bore in the lower manifold 484 about the injection rod 292. Although the injection rod 292 of the illustrated embodiment includes a cylindrical rod that moves linearly within the internal bore, the injection rod 292 may have alternative constructions. For example, the injection rod may alternatively be a screw that has flights and is configured not only for linear motion, but also to rotate within the internal bore.

The rotary valve 284 of this embodiment is configured to seat within the upper manifold 482. In this embodiment, the rotary valve 284 generally includes a tapered first end 502, a through passage 504, a cross passage 506, an annular seat 508 and a second end 510 with a drive flat 458 (See FIG. 40). The rotary valve 284 also defines an internal bore 512. The first end 514 of the internal bore 512 is counterbore and threaded to receive a threaded end on valve cap 516. The second end of 518 of the internal bore 512 is counterbore and threaded to receive a threaded end on the nozzle 232. The rotary valve 284 is fitted with a plurality of seals, including seal 520 fitted over the annular seat 508, seal 522 fitted over the first end 502, seal 524 fitted inside the first end 514 of the internal bore 512 and seal 526 fitted into the second end 518 of the internal bore 512. In the illustrated embodiment, the various seals 520, 522, 524 and 526 are o-ring seals, but they may be other types of seals as desired. In the illustrated embodiment, the nozzle 232 is a tubular structure defining an internal bore 538. The nozzle 232 has a first end 530 affixed to the rotary valve 284 and a second end 532 affixed to a nozzle tip 534. A seal 536 may be fitted between the nozzle 232 and the nozzle tip 534. As noted above, the needle 348 of the illustrated embodiment is fitted within the rotary valve 284 and the nozzle 232. In the illustrated embodiment, the needle 348 is concentrically and coaxially disposed with the internal bore 512 in the rotary valve 284, the internal bore 538 of the nozzle 232 and the internal bore 540 of the valve cap 516. In this embodiment, a shoulder washer 542, thrust bearing 544 and clip 546 are fitted over the end of the needle 348. In use, the needle 348 is axially movable within the rotary valve 284 and the nozzle 232 between an open position in which the outlet end of the nozzle 232 is open to discharge material and a closed position in which the outlet end of the nozzle 232 is closed by the needle 348. In this embodiment, the needle 348 is biased in the open position. For example, as shown, the injection module 218 may include a needle return spring 548 fitted into the internal bore 540 of the valve cap 516. More specifically, the injection module 218 may include a needle return spring 548, such as a coil spring, that is fitted over the needle 348 and is compressed between the shoulder washer 542 and the valve cap 516.

The upper manifold 482 defines a tapered seat 500 that is configured to allow passages 504 and 506 in the seated rotary valve 284 to selectively align with the internal bore in the upper manifold 482. In the fill position, the rotary valve 284 is positioned so that through passage 504 is aligned with in the internal bore in the upper manifold 482. This allows material to be drawn into the manifold assembly 480 through the material inlet 486 as the injection rod 292 is retracted. In the inject position, the cross passage 506 is aligned with the internal bore in the upper manifold 482 in a direction facing the injection rod 292. The cross passage 506 is in fluid communication with internal bore 512 in the rotary valve 284 and, in turn, the internal bore of the nozzle 232. As a result, material contained in the manifold assembly 480 is expelled through the rotary valve 284 and nozzle 232 as the injection rod 292 is extended. As noted above, the rotary valve 284 is moved between the load and inject positions by the rotary valve actuator.

Figure 45:
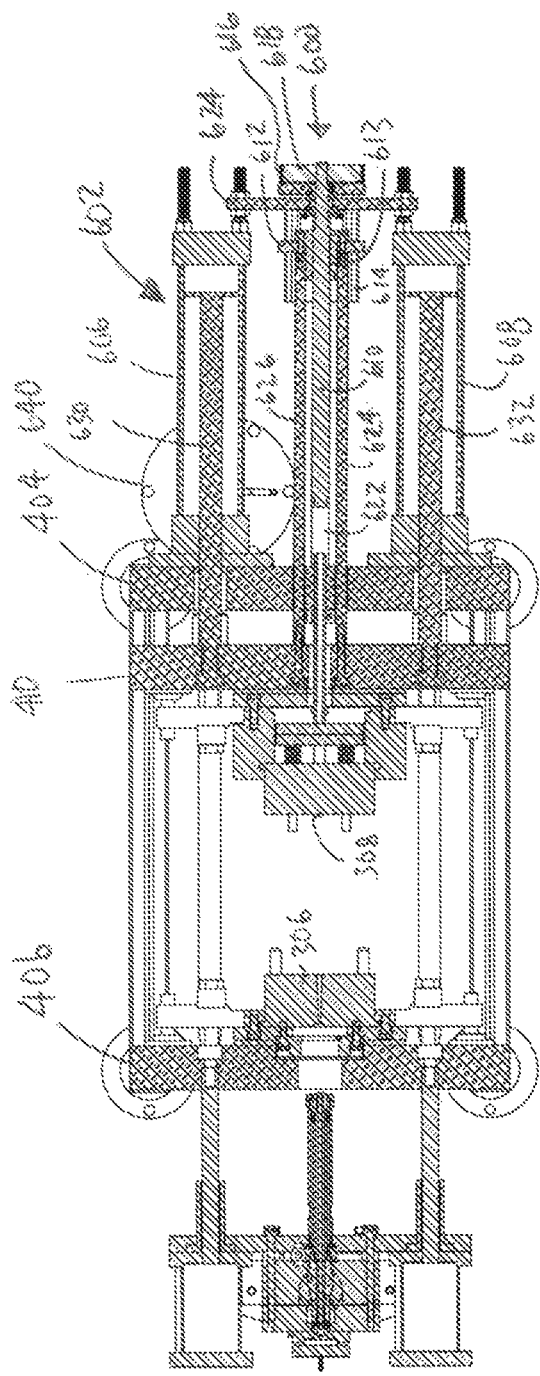
FIG. 45 is a sectional top view of the injection molding machine and mold.

As discussed above, the injection molding machine 210 includes a clamping system 300 that is configured to open and close the mold press 212 (and consequently the mold parts 306 and 308), and to apply the desired clamping force to the mold press 212 (and consequently the mold parts 306 and 308). In the illustrated embodiment, the "A-side" mold part 306 is secured to the injection platen 406 and the "B-side" mold part 308 is secured to the movable platen 410. The clamping system 300 is connected to the end platen 404 and includes a platen linear actuator 600 and a hydraulic clamping system 602. Referring now to FIGS. 43 and 45, the platen linear actuator 600 of the illustrated embodiment includes a fixed mounting structure having a pair of guide posts 620 and 622 mounted to the end platen 404 and an end plate 624 mounted to the free ends of the guide posts 620 and 622. The platen linear actuator 600 also includes a ball screw 610 that is rotatable mounted to the end plate 624 and a traveling plate 612 with a ball nut 613 that is slidably fitted over the guide posts 620 and 622 and threadedly fitted over the ball screw 610. The traveling plate 612 and ball nut 613 are secured against rotation by the guide posts 620 and 622 so that rotation of the ball screw 610 causes linear movement of ball nut 613 and traveling plate 612 along the ball screw 610 and the guide posts 620 and 622. The platen linear actuator 600 further includes a pair of movable platen rods 624 and 626 that are coupled at one end to the traveling plate 612 and at the other end to the movable platen 410. In use, linear movement of the traveling plate 612 results in linear movement of the platen rod 604 and consequently the movable platen 410. In the illustrated embodiment, the ball screw 610 is rotated by a motor 614, such as an electric stepper motor. The motor 614 may be coupled to the ball screw 610 by essentially any drive components. However, in the illustrated embodiment, the motor 614 is coupled to the ball screw 610 by a belt 616 and pulley 618. The belt and pulley may be replaced by other drive components, such as a gear assembly or by direct coupling of the ball screw 610 to the motor 614. When used, the gear assembly may be configured to provide a transmission that reduces or increases ball screw 610 relative to the motor speed. Although not shown, the platen linear actuator 600 may include limit switches or other position sensors capable of providing feedback on the position of the ball screw 610 and consequently the platen rod 604. For example, the system may include limit switches at opposite limits of the range of motion of the traveling plate 612 and/or ball nut 613 to identify when the platen rod 604 has been fully extended or fully retracted.

Figure 44:
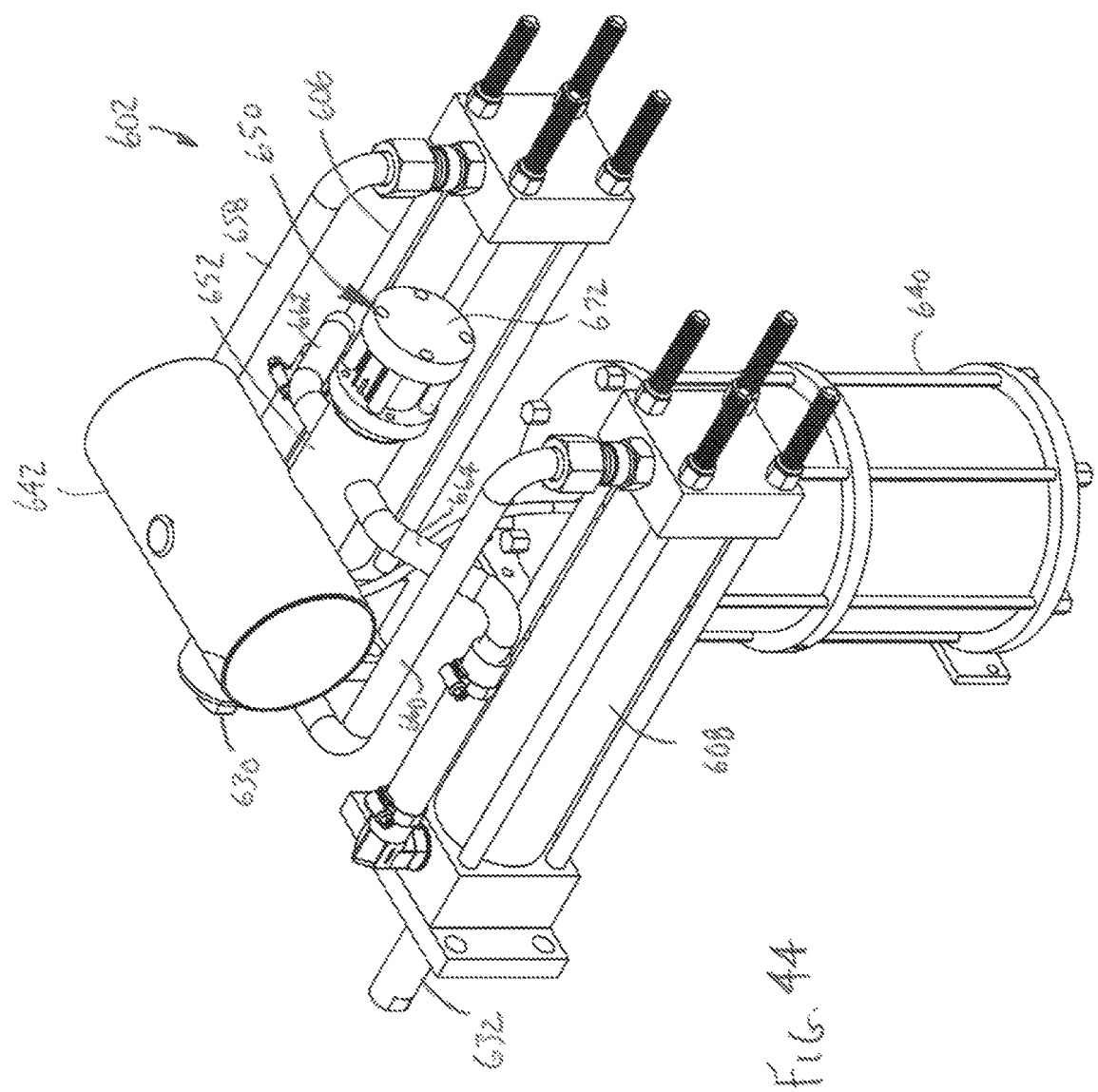
FIG. 44 is a perspective view of the hydraulic clamping system.

Referring now to FIGS. 44 and 45, the hydraulic clamping system 602 includes a pair of hydraulic cylinders 606 and 608 that are mounted to the end platen 404. Each hydraulic cylinder 606 and 608 includes a cylinder rod 630 and 632, respectively, that passes through the end platen 404 and is coupled to the movable platen 410. The number and placement of cylinders may vary from application to application, as desired. In the illustrated embodiment, the hydraulic clamping system 602 is configured to apply clamping force to the mold assembly when the mold assembly is in the closed position. In the illustrated embodiment, clamping force is applied by introducing hydraulic fluid into the piston side of the cylinders 606 and 608 using a hydraulic intensifier 640. The hydraulic intensifier 640 of this embodiment is an air over oil hydraulic intensifier selected to provide the desired clamping force. A variety of suitable air/oil hydraulic intensifiers are readily available. Although the illustrated embodiment incorporates an air/oil hydraulic intensifier, other types of intensifiers may be used in the alternative, such as an oil/oil hydraulic intensifier. As another alternative, the hydraulic intensifier may be replaced by other sources of high pressure hydraulic fluid, such as a hydraulic pump.

In the illustrated embodiment, the hydraulic clamping system 602 is configured to apply clamping force to the closed mold assembly, but is not employed to open and close the mold assembly. Instead, the platen linear actuator 600 is used to open and close the mold assembly. More specifically, in this embodiment, the platen linear actuator 600 is configured to move the movable platen 410 between open and closed position. Because the cylinder rods 630 and 632 are coupled to the movable platen 410, they move with the movable platen 410. To allow the cylinder rods 630 and 632 to move with the movable platen 410, the hydraulic cylinders 606 and 608 are capable of being placed in "float mode" while the platen linear actuator 600 is operation. In float mode, hydraulic fluid is free to flow between the piston and rod sides of the hydraulic piston 634 as the cylinder rods 630 and 632 are extended or retracted by motion of the platen linear actuator 600. A fluid reservoir 642 is coupled to the hydraulic circuit to handle the hydraulic fluid volume imbalance that occurs with extension and retraction of the cylinder rods 630 and 632. In the illustrated embodiment, the hydraulic clamping system 602 includes a free-float valve manifold assembly 650 that is capable of placing the hydraulic cylinders 606 and 608 in float mode by selectively placing the rod and piston sides of each cylinder in fluid communication. As perhaps best shown in FIGS. 30 and 33, the free-float valve manifold assembly 650 generally includes a free-float manifold 652, a free-float valve 654 and a free-float valve actuator 656. The free-float valve 654 is capable of being seated in the manifold 652 against valve seat 668. When seated, the free-float valve 654 generally divides the interior of the manifold into a high pressure side 680 and a low pressure side 682. The high pressure side 680 of the free-float manifold 652 is coupled to the piston side of each hydraulic cylinder 606 and 608 by lines 658 and 660. Similarly, the low pressure side 682 of the free-float manifold 652 is coupled to the rod side of each hydraulic cylinder 606 and 608 by lines 662 and 664 and fluid reservoir 642. The manifold 652 includes a valve spring 670 that biases the free-float valve 654 against the valve seat 668 in the closed position. The free-float valve actuator 656 of the illustrated embodiment includes an air cylinder 672 have a cylinder rod 674 that passes into the manifold 652 and is capable of selectively unseating the free-float valve 654 from the valve seat 668 when the air cylinder 672 is extended. In this embodiment, a seal 684 is fitted about the cylinder rod 674. When unseated, fluid is free to flow through the interior of the manifold 654 between the piston and rod sides of the hydraulic cylinders 606 and 608.

In the illustrated embodiment, the present invention includes an ejector assembly 700 that facilitates simply and effective removal of molded parts from the mold cavity. Referring now to FIGS. 33 and 45, the ejector assembly 700 generally includes an ejector post 702, an ejector plate 704, guide rods 706 and plate springs 708. The ejector post 702 is affixed to fixed platen 404 and extends into the interior of the mold press 12. The movable platen 410 defines an ejector post opening 710 that allows the ejector post 702 to pass through the movable platen 410 to engage the ejector plate 704. The ejector plate 704 includes an ejector pin 712 and is movable mounted over guide rods 706. Plate springs 708 are fitted between mold part 308 and the ejector plate 704 to bias the ejector plate 704 away from the mold part 308. When the mold press 212 is opened, movement of the movable platen 410 causes it to passes over the fixed ejector post 702. As the movable platen 410 continues to move, the ejector post 702 engages the ejector plate 704 and forces the ejector plate 704 toward the mold part 308 a sufficient distance for the ejector pin 712 to eject the molded part from the mold cavity. The platen linear actuator motor 614 may be operated to facilitate ejection of the molded part. For example, the motor 614 may move the movable platen 410 back and forth a number of times to help separate the molded part from the mold cavity. Although the illustrated embodiment includes a single ejector pin 712, the ejector plate 704 may include essentially any desired number of ejector pins.

Operation of the Alternative Embodiment

Operation of the alternative embodiment shown in FIGS. 26-45 will now be described. Operation of the injection molding machine 210 can be generally divided into the following stages: (a) closing the mold, (b) clamping the mold, (c) applying a vacuum to the mold, (d) injecting material in to the mold, (e) curing the molded part and (f) opening the mold and ejecting the molded part. These general stages represent one method for operating the injection molding machine 210 of FIG. 26-45. The injection molding machine 210 may be operated in accordance with an alternative method. For example, in alternative embodiments, the injection system 214 and the clamping system 300 may be used separately from one another. As another example, in some embodiments, the injection system 214 may be used without the vacuum functionality. In such embodiments, the vacuum structure (e.g. vacuum sleeve 328 and vacuum port 420) may be eliminated from the machine 210 or it may simply not be used.

Description of the operation of the injection molding machine 210 will begin with the mold press 212 in the open position with the mold parts 606 and 608 separated from one another as shown in FIGS. 26, 28, 33 and 45. From this initial position, the mold assembly is closed by placing the free-float valve manifold assembly 650 in the "free float" mode and then operating the platen linear actuator 600 to move the movable platen 410 into the closed position. More specifically, the free-float cylinder 672 is operated to extend cylinder rod 674 and unseat the free-float valve 654 from valve seat 668. While the free-float valve manifold assembly 650 is held in the free-float position, the linear actuator motor 614 is operated to rotate ball screw 610 in a direction that causes the traveling plate 612 to move down the length of the ball screw 610 toward the mold press 212. This motion of the traveling plate 612 in turn moves the platen rods 624 and 626 toward the mold press 212, thereby causing the movable platen 410 to move into the closed position in which mold part 306 and mold part 308 are in intimate, face-to-face contact. The motor 614 may be operated until a limited switch (not shown) is reached, a specific number of motor steps have been taken or until a load cell or other load sensor (not shown) indicated that sufficient force is applied. Once closed, the hydraulic clamping system 602 is operated to apply clamping force to the mold assembly. More specifically, the free-float cylinder 672 is operated to retract cylinder rod 674 to allow the valve spring 670 to bias the free-float valve 654 into the valve seat 668. The seated valve 654 separates the high pressure and low pressure sides of the interior of the manifold 652. While the free-float valve 654 is seated, the hydraulic intensifier 642 is operated to supply hydraulic oil at the desired pressure to the piston sides of the two hydraulic cylinders 606 and 608. In this embodiment, the hydraulic intensifier 640 is operated by supplying air at the desired pressure to the inlet of the hydraulic intensifier 640. If desired, the system may include a load cell, pressure sensor or other load sensor to determine when and how much of the desired clamping force is applied to the mold assembly.

Once the mold assembly is closed and the desired clamping force is applied, the injection module 218 is filled with material. Before filling the injection module 218, the needle cylinder 350 is extended, thereby causing the needle 348 to close the outlet end of the nozzle 232. To prepare the injection module 218 to receive material, the rotary valve 284 is moved into the fill position (See FIG. 38). In this embodiment, the rotary valve 284 is moved into the "fill" position by the injection module valve actuator 282. As shown in FIG. 41, the pneumatic cylinder 450 is retracted to operate scotch-yoke 452 and rotate the rotary valve 284 into the fill position. Once the rotary valve 284 is in the fill position, material can be drawn into the injection module 218 by the injection rod actuator 290. As noted above, a source of material can be coupled to the material inlet fitting 488. For example, in the context of a liquid silicone rubber ("LSR") mold, a conventional LSR cartridge can be affixed to the material inlet fitting 488. The injection rod 292 is retracted by operation of motor 432. As noted above, rotation of the motor 432 turns gear assembly 434 and ball screws 438. The rod plate 438 travels along the ball screws 438 to retract the injection rod 292. Operation of the motor 432 can be carefully controlled to ensure the proper amount of material is drawn into the manifold assembly 480. Once the injection module 218 is loaded, the rotary valve 284 is rotated into the inject position by extending pneumatic cylinder 450 (See FIG. 30).

Once the injection module 218 is filled with material, the injection system 214 is moved into the vacuum position and a vacuum is applied to the mold cavity. The carrier plate 222 is moved to position the injection system 214 into the vacuum position by retracting pneumatic cylinders 414 into the position shown in FIGS. 30 and 31 then exhausting air pressure so that the nozzle 232 not clamped to the mold face. Without clamp force the vacuum sleeve tip 374 can push end of the nozzle slightly away from the mold face. In this position, the vacuum sleeve 238 is engaged with the mold face, but the nozzle 232 is not. Instead, there is at least a small gap or non-air tight connection between the tip of the nozzle 232 and the nozzle seat in the mold face. Once in the vacuum position, an external vacuum source is applied to the vacuum port 420 to draw a vacuum in the mold cavity via the sleeve 238 and the sprue. If desired, a pressure sensor (not shown) may be provided to determine when the desired vacuum has been applied.

Following application of the desired vacuum, the injection system 214 is moved into the injection position and material is injected into the mold assembly more freely since the air inside has been extracted. More specifically, the carrier plate 222 is moved to position the injection system 214 into the injection position by re-applying air pressure and fully retracting pneumatic cylinders 414 into the position shown in FIG. 32 while applying constant clamp force between the nozzle tip 232 and the nozzle seat in the face of the mold. In this position, the nozzle 232 tip is seated firmly in the nozzle seat in the mold face. The needle 348 is retracted into the open position by retracting needle cylinder 350. In this embodiment, the needle cylinder spring and needle spring help to move the needle cylinder and needle into the open position. Once the needle 348 is open, the injection rod 292 is extended by operation of motor 432 in the opposite direction. Again, rotation of the motor 432 turns gear assembly 434 and ball screws 438. The rod plate 438 travels along the ball screws 438 to extend the injection rod 292. Operation of the motor 432 can be controlled to ensure the proper dosage of material is ejected into the manifold assembly 480. Additionally or alternatively, load cell washer 444 may be used to measure the amount of force is applied to the injection rod 292. After the mold cavity has been filled, the needle 348 may be extended by operation of the needle cylinder 350 to close the nozzle 232. For purposes of disclosure, operation of the present invention is described in the context of a method in which material is drawn into the injection module 218 before the vacuum has been applied. In alternative embodiments, the injection module 218 may be loaded with material before the vacuum is applied.

In typical applications, it may be desirable to retain the injection system 214 in the injection position until the material has had sufficient time to cure in the sprue. Once the material is sufficient cured, the injection system 214 may be moved away from the mold assembly to the open position by operation of pneumatic cylinders 414. The halves remain clamped until the material has sufficient cured. This is typically based on time and temperature. The mold halves are typically fitted with heater cartridges and thermocouple sensors for heat cured LSR material as shown in FIG. 1a (not shown in alternate embodiment). The heater cartridges controlled with a temperature controller such as the systems offered by Omega Engineering. Mold tools are typically brought up to a set temperature such as 325 degrees F. for fast curing of LSR material. An additional control system may include a timer and may be programmed to wait a predetermined period of time for curing before opening the mold press 212. Non-heat cured materials may be cured using the appropriate curing methods. For example, UV-cured LSR is cured with only ultraviolet light at room temperature. No heater cartridge, sensors or temperature control system are needed for UV-cured LSR. Instead special mold materials, such as clear acrylic, are created to allow a UV light source in to the mold assembly to cure the material.

The mold press 212 is opened by operation of the platen linear actuator 600. More specifically, the mold assembly is opened by placing the free-float valve manifold assembly 650 in the "free float" mode and then operating the platen linear actuator 600 to move the movable platen 410 into the open position. As discussed above, the free-float cylinder 672 is operated to extend cylinder rod 674 and unseat the free-float valve 654 from valve seat 668. While the free-float valve manifold assembly 650 is held in the free-float position, the linear actuator motor 614 is operated to rotate ball screw 610 in a direction that causes the traveling plate 612 to move up the length of the ball screw 610 away from the mold press 212. This motion of the traveling plate 612 in turn moves the platen rods 624 and 626 away from the mold press 212, thereby causing the movable platen 410 to move into the open position. During this operation, the motor 614 may be operated until a limited switch (not shown) is reached or a specific number of motor steps have been taken.

As can be seen, the alternative injection molding machine 210 of FIGS. 26-45 includes a removably attachable injection module 218 that can be readily removed and cleaned with greater ease. A spare (pre-cleaned) injection module could also be used to swap out one in the machine 210 that needs cleaned reducing material change over time to minutes. In this embodiment, the injection module 218 includes all components that come in contact with the material being molded so no cleaning of machine components are required. The present invention is not, however, limited to embodiments in which injection modules includes all the components that come in contact with the material. Further, in this embodiment, the injection module 218 is removably attachable to the machine 210, which allows it to be cleaned more easily. In this embodiment, the machine 210 provides all of the mechanisms used to actuate the injection process, including moving the injection rod 292, traversing the nozzle 232 to and from the mold 213, material valve 284 operation and seating and unseating the needle 348 inside the nozzle 232. This means that the actuators do not need to be duplicated in each injection module, thereby reducing overall cost when interchangeable injection modules are used. The injection module 218 design shown is for liquid silicone rubber ("LSR") and uses an injection rod. Components of the injection module 218 that come in contact with the material are the injection rod 292, the inside bore of the manifold assembly 480, the material valve 284, the inside bore of the nozzle 232, etc. The injection module can be readily cleaned without solvents. When the injection module components are disassembled the individual parts are relatively small with straight through holes. Further, O-rings are positioned to protect the material from contacting the threads. Placing the components into a small oven and bake curing the LSR can be achieved in minutes. Once the material has cured it turns into rubber cylinder shaped pieces that can be pulled or pushed out of their respective bores (e.g. the manifold bore). Cured material on exterior surfaces like the needle or injection rod can simply be peeled away. Once the cured material is removed from the components the injection module can be re-assembled and ready for use. Although all of the actuators are carried by the machine rather than the injection module in the illustrated alternative embodiment, this is not strictly necessary and the present invention may be implemented with one more of the actuators integrated into the injection module.

In the embodiment of FIGS. 26-45, the injection module 218 is inserted into the machines carrier plate 222 and a clamp 418 is used to secure the module 218 in place. The machine 210 is now shown in a horizontal configuration. The platens 404, 406 and 410 open and close horizontally as well as the injection system 214. Nozzle 232 position adjustment is not needed as it enters though the back of mold part 306 instead of along the parting line. In this embodiment, the swing clamps shown in the embodiment of FIGS. 1-25 are replaced by a single module clamp 418 that includes the needle cylinder 350 that actuates the needle 348 within the nozzle 232. The module clamp 418 is secured in place by two screws 423 that pass through the carrier plate 222 and have knobs for tool free attachment and detachment. The module clamp 418 is captivated on a clamp guide bolt 425 for ease of handling during the removal of the injection module 218. Both the needle 348 and needle cylinder 350 have return springs to retract and un-seat the needle 348 and let material flow through the nozzle 232. When air is applied to the needle cylinder 350 the needle 348 is pushed forward and against the nozzle 232 to shut off material flow.

The injection (piston) cylinder with mechanical stroke adjustment of the embodiment of FIGS. 1-25 has been replaced with an electronically controlled injection rod actuator assembly 424 to control injection rod 292 stroke distance and speed. This injection rod actuator assembly 424 includes a stepper motor 432 driving a pair of ball screws 436 bridged by a rod plate 438 that allows attachment of the injection rod 292 in between. The rod plate 438 moves to push or pull the injection rod 292. Other embodiments could include any type of actuator arrangement such as in-line, belt driven, DC electric motor with potentiometer position feedback, etc. that allows attachment and detachment of the injection module and injection rod. The rod plate 438 allows convenient attachment of the injection rod 292. A shoulder screw 4440 with a knob end can also be used for tool free attachment and detachment of the injection rod 292 to the rod plate 438. A load cell washer 444 is shown and may be used within the rod plate 438 and in contact with the bottom of the injection rod 292 to provide injection pressure feedback.

The spool valve of FIGS. 1-25 has been replaced by a rotary valve 284 concentric with the needle 348 for a more compact design. A tapered valve seat has been added to help provide a positive shut off to prevent backflow when the nozzle 232 is clamped tight against the mold and injection is occurring. Other embodiments could include alternate valves such as check valves or a tapered spool valves. The illustrated rotary valve 284 has a front portion that has a flat 458 that acts as a drive surface. This portion fits inside a 90 degree 'scotch-yoke' or 'rack and pinion' type rotary actuator 452 with a cylindrical interior keyway 454 and corresponding drive surface flat 456 mounted within the carrier plate 222. In one position the rotary valve 284 allows material into the injection manifold 218 from the material entry inlet 486. In the other position the rotary valve 284 blocks the inlet 486 and directs material through the nozzle 232 for injection. The spool valve of FIGS. 1-25 has been replaced by a rotary valve 284 concentric with the needle 348 for a more compact design. A tapered valve seat has been added to help provide a positive shut off to prevent backflow when the nozzle 232 is clamped tight against the mold and injection is occurring. Other embodiments could include alternate valves such as check valves or a tapered spool valves. Those valves could be part of the material supply or otherwise integrated into the flow path feeding material to the injection module 218.

The carrier plate 222 of FIGS. 26-45 has been reshaped to accept the rotary valve actuator 282, a module mount 412 for the injection module 218 and the corresponding module clamp 418. Linear bearings may surround the rods of the tandem double acting air cylinders 414.

In the embodiment of FIGS. 26-45, a pair of rods 428 with threaded ends extend from the carrier plate 222 down to the linear actuator arrangement 424 which includes the moving rod plate 438 and a pair of fixed plates 430 and 442 to mount the stepper motor 432 and the gear assembly 434.

In the embodiment of FIGS. 26-45, the injection module 218 consists of cylindrically shaped parts threaded together with O-ring seals to contain the material under pressure. Components may be made from stainless steel or steel. The needle 348, rotary valve 284, nozzle 232 and injection rod 282 are all contained in the injection module 218. The exposed end of the needle 348 may define a groove for a c-clip 546, return spring 548 and bushing 544 that un-seat the needle 348 from inside the nozzle 232 tip. When activated, the spring return needle cylinder 350 inside the module clamp 418 pushes to seat the needle 348 and shut off material from spilling out of the nozzle 232. When air is exhausted from the needle cylinder 350 the needle 348 and needle cylinder 350 will retract.

The injection manifold 480 of the embodiment of FIGS. 26-45 has been separated into two pieces that are threaded together. The upper manifold 482 contains the rotary valve 284 and the lower manifold 484 contains the injection rod 292 and associated cylinder. This arrangement allows different size injection rods and cylinders to be attached obtain the desired material dosage or 'shot size' for the part being molded.

As can be seen, the embodiment of FIGS. 26-45 is part of a machine 210 that has a horizontal die set arrangement with a fixed end platen 404 used for mounting the clamping system, a movable platen 410 used to mount the ejection or 'B-side" of the mold (mold part 308) and a fixed injection platen 406 used to mount the 'A-side' of the mold (mold part 306) and the injection system 214.

In this embodiment, the invention uses a low cost electronic platen linear actuator 600 including an electric motor 614 and ball screw 610 to open and close the platens. Any type of electric motor could be used but this embodiment shows a stepper motor rotating a ball screw 610 by belt 616 and pulley 618. The ball nut 613 is held fixed from rotation by a traveling plate 612 with bushings that ride along a pair of guide posts 620 and 622. The traveling plate 612 also has a pair of platen connecting rods 624 that attach to the movable platen 410. The stepper motor 614 is programmed to open and close the movable platen 410 at the desired speed and distance best suited for tool being used for molding. A fixed ejection post 702 is mounted to the fixed end platen 404 and facing the movable platen 410. To open the mold and eject the part the platen linear actuator 600 moves the movable platen 410 back towards the ejection post 702. The ejection post 702 comes in contact with the spring loaded ejector plate 704 of the B-side mold part 308 and the ejection process begins. The platen linear actuator 600 moves the movable platen 410 further back so that the ejection post 702 pushes the ejector plate 704 with the desired programmable motion to eject the part from the mold part 308.

After the part is ejected the movable platen 410 is closed by the platen linear actuator 600 to begin mold clamping with the hydraulic system 602. The low cost platen linear actuator 600 has sufficient force to open, close and eject but, in this embodiment, not enough force to clamp the molds against high pressures involved during injection and curing of material. The hydraulic clamping system 602 consists of a pair of hydraulic cylinders 606 and 608 mounted on either side of the platen linear actuator 600. The cylinder rods 630 and 632 are connected to the movable platen 410. A free-float valve manifold assembly 650 with oil reservoir 642 and tubular oil lines 658, 660, 662 and 664 connect to both rod and piston side ports of the cylinders 606 and 608. The free-float valve includes a steel ball 654 and spring 670 that seats the ball 654 in the valve seat 668 creating a check valve to prevent oil flow going from the piston side to the rod side of the cylinders 606 and 608. An air cylinder 672 with rod 674 adjacent to the steel ball 654 is at the other end of the valve manifold. When the air cylinder 672 is activated the rod 674 pushes the steel ball 654 off its seat 668 and allows free flow of oil between both rod and piston sides of the hydraulic cylinder 606 and 608 in both directions. This allows the hydraulic cylinders 606 and 608 to 'free float' so that the platen linear actuator 600 can open and close the mold and eject parts as described. The reservoir 642 on the valve manifold takes up the excess oil displaced by the piston side of the hydraulic cylinders during opening and returns the excess oil to the piston side during closing.

After the mold has been closed by the platen linear actuator 600 the air cylinder 672 exhausts, thereby seating the steel ball 654 in the valve seat 668. High pressure oil is applied (e.g. 3200 psi) through a port on the piston side of the valve 654 to create the tonnage desired to clamp the mold. The tonnage level is dependent on the piston area of the hydraulic cylinders used on the machine. For instance, a pair of 4 inch diameter cylinder will produce about 40 tons of clamp force at 3200 psi. After the part has cured, high pressure oil is removed, the air cylinder 672 opens the valve 654 to allow the cylinders 606 and 608 to free float and the platen linear actuator 600 opens the mold. A compact, energy efficient 40:1 air/oil intensifier is used in this embodiment to provide high oil pressure. Other embodiments could use other electric or pneumatic intensifier devices but a 40:1 air/oil unit creates 3200 psi of oil pressure using just 80 psi of air pressure which is readily available in manufacturing facilities.

The combination of this hydraulic circuit and programmable linear motion provides a smaller, lower cost and more energy efficient high tonnage clamping system than typical prior art machines. The low cost, lower force programmable platen linear actuator can operate all aspects of the molding process except clamping from 120 volt single phase electric power. The air/oil intensifier 640 provides the clamping tonnage needed with low cost readily available air pressure. The arrangement is chosen to save space and use conventional cylinders. A single hydraulic, multiple or integrated tie rod hydraulic cylinders could be used in other embodiments.

The embodiment of FIGS. 26-45 uses a single rigid tube as the vacuum sleeve 238 with a custom rubber tip 374 as the face seal against the mold. Although the injection molding machine 210 can be operated in a variety of alternative ways, the injection process, including the vacuum portion, can be implemented as follows:

- The injection module 218 is in the retracted position pulled away from the mold tool. The mold is heated and closed.
- Uncured LSR material enters into the injection module 218 with the rotary valve 284 in the fill position and the needle 348 seated inside the nozzle 232 (air applied to needle cylinder 350).
- The injection rod 292 moves down from a top position to a lower dosage position to draw LSR material into the injection manifold. The lower dosage position and diameter of the injection rod 292 determines the shot size.
- The rotary valve 284 rotates to the eject or injection position.
- The tandem air cylinders move the injection module 218 and nozzle 232 up against the mold and the rubber tip contacts the mold face.
- Air is exhausted from the air cylinders 218 to take away the force pressing the nozzle 232 against the mold but the rubber tip is still in contact with the mold but acts as a soft spring to push the nozzle 232 slightly away from the mold.
- A vacuum is then applied inside the vacuum sleeve 238 (via the port in the carrier plate 222) drawing air from the mold cavity through the sprue bushing and around the outside of the tip of the nozzle 232.
- Air is re-applied to the tandem air cylinders clamping the nozzle 232 against the mold and also applying force against the tapered seat of the rotary valve 284.
- Air is exhausted from the needle cylinder 350 retracting the needle 348 from its seat
- The actuator moves the injection rod 292 at the desired speed back to the top position forcing material through the nozzle 232 and into the mold.
- Air is re-applied to the needle cylinder 350 to shut off additional flow through the nozzle 232 and the vacuum is ceased.
- After sufficient time for the material to cure in the sprue area, the injection module 218 and nozzle 232 are pulled away from the mold.
- Positive air pressure may be then sent down the vacuum sleeve 238 via the same port in the carrier plate 222 in order to air-cool the tip of the nozzle 232 if desired up until the next vacuum application.
- After the material has fully cured in the mold parts 306 and 308, the mold platens 404 and 410 open and the part and sprue is ejected or removed from the mold tool.
- Process repeats for the next cycle, as desired.

The above description is that of current embodiments of the invention. Various alterations and changes can be made without departing from the spirit and broader aspects of the invention. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are as follows:

1. An injection molding machine comprising:
 a die set configured to receive a mold;
 a clamping system operable to selectively move the die set between an open position and a closed position; and
 an injection system configured to introduce material into a mold, the injection system having a carrier and an injection module, the injection module being removably attached to the carrier, the injection module having an injection module inlet for receiving material from a supply of material and defining at least a portion of the flow path from the injection module inlet to a mold, wherein the injection module includes a manifold, a nozzle and an injection rod movably disposed within the manifold, the injection rod being retractable to draw material into the manifold and extendable to eject material from the manifold out through the nozzle.

2. The injection molding machine of claim 1 wherein the injection system includes at least one injection system linear actuator to selectively move the carrier and injection module toward and away from the mold assembly.

3. The injection molding machine of claim 1 wherein the injection module includes a valve, the valve being selectively movable between an open position in which the injection module inlet is in communication with the manifold so that the injection rod can draw material into the manifold and a closed position in which the manifold is in communication with the nozzle so that the injection rod can eject material from the manifold out through the nozzle.

4. The injection molding machine of claim 3 wherein the valve is a rotary valve.

\* \* \* \* \*